United States Patent
Takamizawa et al.

(10) Patent No.: US 12,468,378 B2
(45) Date of Patent: Nov. 11, 2025

(54) HEAD MOUNTED INFORMATION PROCESSING APPARATUS AND HEAD MOUNTED DISPLAY SYSTEM

(71) Applicant: MAXELL, LTD., Kyoto (JP)

(72) Inventors: Naohisa Takamizawa, Kyoto (JP); Mayumi Nakade, Kyoto (JP); Yoshinori Okada, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/619,058

(22) Filed: Mar. 27, 2024

(65) Prior Publication Data
US 2024/0264662 A1     Aug. 8, 2024

Related U.S. Application Data

(63) Continuation of application No. 17/439,647, filed as application No. PCT/JP2019/011283 on Mar. 18, 2019, now Pat. No. 11,972,037.

(51) Int. Cl.
*G06F 3/01*     (2006.01)
*G02B 27/00*    (2006.01)
(Continued)

(52) U.S. Cl.
CPC .......... *G06F 3/011* (2013.01); *G02B 27/0093* (2013.01); *G02B 27/0101* (2013.01);
(Continued)

(58) Field of Classification Search
CPC .......... G06F 3/011; G06F 3/012; G06F 3/013; G06F 3/016; G06F 3/0346;
(Continued)

(56) References Cited

U.S. PATENT DOCUMENTS 9,865,068 B2    1/2018  Tsurumi et al.
2013/0088516 A1* 4/2013 Ota .................. G06T 19/006
                                                  345/633
(Continued)

FOREIGN PATENT DOCUMENTS

EP    2426646 B1    3/2012
EP    2570994 B1    3/2013
(Continued)

OTHER PUBLICATIONS

Office Action issued in the corresponding Japanese Application No. 2023-028328 dated Nov. 28, 2023, with English Translation.
(Continued)

*Primary Examiner* — Brent D Castiaux
(74) *Attorney, Agent, or Firm* — Rimon P.C.

(57) ABSTRACT

In a head mounted information processing apparatus, a control unit includes a virtual object generation processing unit configured to generate a virtual object to be displayed by the display unit. The virtual object generation processing unit is configured to generate a first virtual object that is arranged so as to be associated with a first real space where a user exists and a second virtual object that is arranged so as to be associated with a second real space different from the first real space. The control unit is configured to cause the display to display the first virtual object and the second virtual object in accordance with virtual object display instruction information for instructing display of the first virtual object and the second virtual object, which is inputted through an operational input interface.

2 Claims, 21 Drawing Sheets

(51) Int. Cl.
  *G02B 27/01* (2006.01)
  *G06T 19/00* (2011.01)
  *G06V 20/20* (2022.01)

(52) U.S. Cl.
  CPC ..... *G02B 27/0172* (2013.01); *G02B 27/0179* (2013.01); *G06T 19/006* (2013.01); *G06V 20/20* (2022.01); *G02B 2027/0123* (2013.01); *G02B 2027/0138* (2013.01); *G02B 2027/014* (2013.01); *G02B 2027/0178* (2013.01); *G02B 2027/0187* (2013.01)

(58) Field of Classification Search
  CPC ............ G02B 27/0093; G02B 27/0101; G02B 27/0172; G02B 27/0179; G02B 27/017; G02B 2027/0123; G02B 2027/0138; G02B 2027/014; G02B 2027/0178; G02B 2027/0187; G06T 19/006; G06V 20/20; G06V 40/18; G06V 40/28
  See application file for complete search history.

(56) References Cited

U.S. PATENT DOCUMENTS

| | | | |
|---|---|---|---|
| 2013/0141419 A1 | 6/2013 | Mount et al. | |
| 2016/0188277 A1* | 6/2016 | Miyasaka | G09G 3/003 345/2.2 |
| 2016/0210784 A1 | 7/2016 | Ramsby et al. | |
| 2018/0299963 A1* | 10/2018 | Fukazawa | G02B 27/017 |
| 2019/0279407 A1* | 9/2019 | McHugh | G06F 3/011 |
| 2020/0097091 A1* | 3/2020 | Chou | G06V 40/28 |
| 2020/0219300 A1 | 7/2020 | Ishikawa et al. | |

FOREIGN PATENT DOCUMENTS

| | | |
|---|---|---|
| JP | 2011-160409 A | 8/2011 |
| JP | 2011-191767 A | 9/2011 |
| JP | 2011-242934 A | 12/2011 |
| JP | 2012-060240 A | 3/2012 |
| JP | 2012-198668 A | 10/2012 |
| JP | 2015-072607 A | 4/2015 |
| JP | 2018-505472 A | 2/2018 |
| JP | 2018-174003 A | 11/2018 |
| JP | 2018-195319 A | 12/2018 |
| WO | 2017/104272 A1 | 6/2017 |
| WO | 2019/013016 A1 | 1/2019 |

OTHER PUBLICATIONS

Notice of Allowance issued in corresponding U.S. Appl. No. 17/439,647, dated Dec. 28, 2023.
Non-Final Office Action issued in the corresponding U.S. Appl. No. 17/439,647, dated May 17, 2023.
International Search Report issued in PCT/JP2019/011283, dated May 21, 2019 w/English Translation.

* cited by examiner

HEAD MOUNTED INFORMATION PROCESSING APPARATUS AND HEAD MOUNTED DISPLAY SYSTEM

CROSS-REFERENCE TO RELATED APPLICATIONS

This application is a Continuation of U.S. patent application Ser. No. 17/439,647, filed on Sep. 15, 2021, which is the U.S. National Phase under 35 U.S.C. § 371 of International Application No. PCT/JP2019/011283, filed on Mar. 18, 2019, the entire contents of each of which are hereby incorporated by reference.

TECHNICAL FIELD

The present invention relates to a head mounted information processing apparatus and head mounted display system, and more particularly, the present invention relates to a technique effective for grasping a position in a virtual object.

BACKGROUND ART

In recent years, a virtual reality (Virtual Reality: VR) technique, an augmented reality (Augmented Reality: AR) technique, or a mixed reality (Mixed Reality: MR) technique has been used widely.

Virtual reality is a technique that allows a user to create a virtual world imitating reality and experience a feeling of being there. Augmented reality is a technique that gives digital information to a real world, and reflects and expands a virtual space (and virtual objects) created by CG (Computer Graphics) or the like in the real space. Mixed reality is a technique that combines and fuses a virtual world artificially created by CG or the like with information in a real world.

As a tool that embodies these techniques, a head mounted information processing apparatus that is mounted on a head of a user and includes a display and a camera is used widely. In the head mounted information processing apparatus, in order to increase the reality of a virtual object, a display method is put into practical use in which the virtual object is associated with a spatial coordinate of a real space to appear as if a real object is present there.

In such a display method, a target virtual object can be recognized visually by going to a real space where the target virtual object is associated and arranged, and this allows an intuitive operation system. However, there has been a problem that the target virtual object cannot be browsed or operated unless a user goes to the real space with which the target virtual object is associated.

As a technique for solving this problem, there is a technique in which by causing at least a part of an augmented reality object in a real world space, a wearer can easily access the augmented reality object even though the wearer moves around the real world space (see Patent document 1, for example).

RELATED ART DOCUMENTS

Patent Documents

Patent document 1: Japanese Patent Application Publication No. 2018-505472

SUMMARY OF THE INVENTION

Problems to be Solved by the Invention

As the technique of Patent document 1 described above, Patent document 1 describes that the virtual object is displayed so as to be kept in a visual field of a user even though the visual field moves. However, in Patent document 1, no consideration is given to display of a virtual object that is present in another real space. Therefore, there is a problem that it is difficult for the user to conveniently view and operate a virtual object that is present in another real space.

It is an object of the present invention to provide a technique capable of easily grasping an existence position and the like of a virtual object that is present in another real space different from a real space.

The foregoing and other objects, features and advantages of the present invention will become more readily apparent from the following detailed description of embodiments of the present invention that proceeds with reference to the appending drawings.

Means for Solving the Problem

An outline of representative invention of the present invention disclosed in the present application will briefly be explained as follows.

Namely, a representative head mounted information processing apparatus includes an operational input interface, a camera unit, a display unit, and a control unit. Information is inputted through the operational input interface. The camera unit is configured to photograph a real space. The display unit is configured to display a photographic image photographed by the camera unit. The control unit is configured to control the display unit.

Further, the control unit includes a virtual object generation processing unit configured to generate a virtual object to be displayed by the display unit. The virtual object generation processing unit is configured to generate a first virtual object and a second virtual object, the first virtual object being arranged so as to be associated with a first real space in which a user exists, the second virtual object being arranged so as to be associated with a second real space different from the first real space.

Moreover, the control unit is configured to cause the display unit to display the first virtual object and the second virtual object in accordance with virtual object display instruction information for instructing display of the first virtual object and the second virtual object, the virtual object display instruction information being inputted through the operational input interface.

Effects of the Invention

Effects obtained by the representative invention of the present invention disclosed in the present application will briefly be explained as follows.

Since it is possible to visually recognize an arrangement place of a virtual object that is arranged in a different real space accurately, it is possible to improve convenience thereof.

BRIEF DESCRIPTIONS OF THE DRAWINGS

DETAILED DESCRIPTION OF EMBODIMENTS

Figure 1:
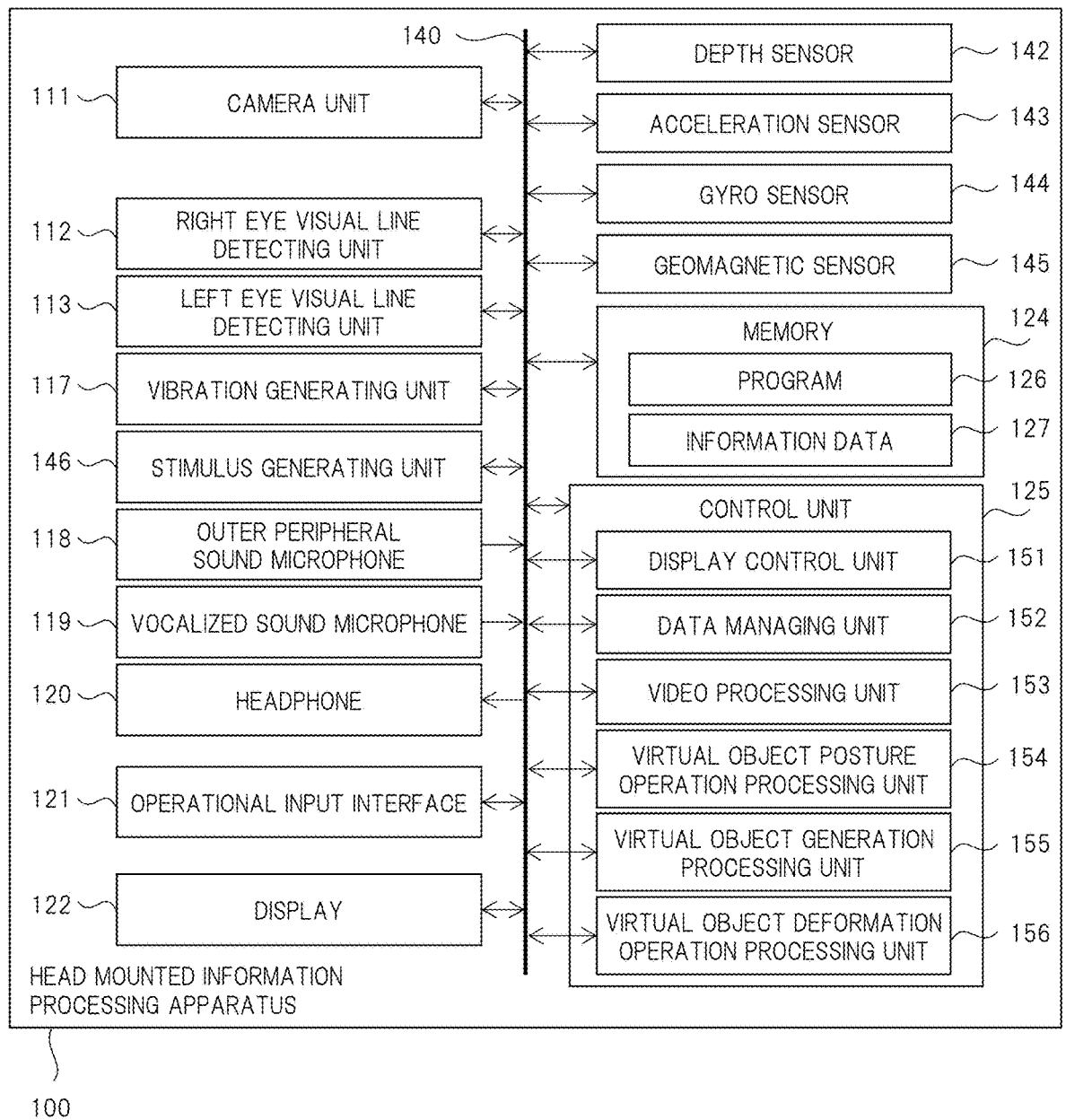
FIG. 1 is a block diagram illustrating one example of a configuration of a head mounted information processing apparatus according to a first embodiment.

In all drawings for explaining embodiments, the same reference numerals are respectively in principle applied to the same members, and repeated explanation thereof will be omitted.

First Embodiment

Hereinafter, an embodiment will be described in detail.
<Configuration Example of Head Mounted Information Processing Apparatus>

FIG. 1 is a block diagram illustrating one example of a configuration of a head mounted information processing apparatus according to a first embodiment.

As illustrated in FIG. 1, a head mounted information processing apparatus 100 includes a camera unit 111, a right eye visual line detecting unit 112, a left eye visual line detecting unit 113, a vibration generating unit 117, an outer peripheral sound microphone 118, a vocalized sound microphone 119, a headphone 120, an operational input interface 121, a display 122, a control unit 125, a memory 124, a depth sensor 142, an acceleration sensor 143, a gyro sensor 144, a geomagnetic sensor 145, and a stimulus generating unit 146. These functional blocks are connected to each other via a bus 140.

The camera unit 111 is configured to photograph a landscape in front of a user. The display 122, which is a display unit, displays a photographic image of a real space, which is photographed by the camera unit 111. The camera unit 111 may be composed of a plurality of cameras, or may be a 360° entire celestial sphere camera capable of photographing an entire celestial sphere image by combining one or a plurality of cameras.

The control unit 125 is configured to execute a program 126 (will be described later) stored in the memory 124 to control the respective functional blocks, thereby controlling an operation of the whole head mounted information processing apparatus 100.

The control unit 125 includes a display control unit 151, a data managing unit 152, a video processing unit 153, a virtual object posture operation processing unit 154, a virtual object generation processing unit 155, and a virtual object deformation operation processing unit 156.

The virtual object generation processing unit 155 is configured to generate a group of virtual objects composed of at least one virtual object that is present in another virtual space different from the real space. Further, the virtual object generation processing unit 155 is configured to arrange the generated group of virtual objects so as to be associated with the real space.

Here, a group of virtual objects arranged so as to be associated with a first real space, which is visually recognized or displayed on the display 122, is a group of first virtual objects. Further, a group of virtual objects arranged so as to be associated with a second real space, which is a real space different from the first real space, is a group of second virtual objects.

Similarly, a group of virtual objects arranged so as to be associated with a third real space, which is a real space different from the first and second real spaces, is a group of third virtual objects. Further, a group of virtual objects arranged so as to be associated with a fourth real space, which is a real space different from the first to third real spaces, is a group of fourth virtual objects.

The virtual object generation processing unit 155 is configured to generate a virtual object on the basis of model data on a virtual object read out from the memory 124 in response to a user operation inputted from the operational input interface 121.

Note that the model data on the virtual object are not always necessary, and virtual object data may be directly generated without any model by a user operation. For example, in order to generate a rectangular parallelepiped virtual object, eight points to become respective vertices of a virtual object are specified in the real space by a user operation using the operational input interface 121.

The virtual object posture operation processing unit 154 is configured to rotate, enlarge, and reduce the virtual object displayed on the display 122 to operate so as to have posture having a shape that is visually recognized easily. This is called a posture operation. a result of the posture operation is not reflected to the posture, the shape, the orientation, and the like of the original virtual object.

The virtual object deformation operation processing unit 156 is configured to execute a deformation operation for the virtual object displayed on the display 122. For example, the deformation operation is an operation of changing the orientation of the virtual object, changing a size thereof, changing the shape thereof, deleting a part thereof, or deleting the whole thereof. A result of the deformation operation by the virtual object deformation operation processing unit 156 is also reflected to the posture, the shape, the orientation, and the like of the original virtual object.

The video processing unit 153 is configured to processes video data photographed by the camera unit 111, and stores the processed video data in the memory 124 as information data 127. The video processing unit 153 is configured to simplify the video data photographed by the camera unit 111 mainly for the purpose of reducing the amount of display data and improving visibility thereof. For example, in a case where there is a square bookshelf in video data, the video data are simplified by simplifying a shape of the square bookshelf as a shape such as a rectangular parallelepiped with an outer shape having the same dimensions.

Further, the video processing unit 153 is configured to execute video processing for facilitating recognition of each space. For example, the video processing unit 153 generates video data from a bird's eye view so as to look down at a space where the user exists at the time of photographing on the basis of the video data photographed by the camera unit 111 from a line of sight of the user.

The display control unit 151 is configured to appropriately combine the information data 127 stored in the memory 124 to generate data for display, and cause the display 122 to display it. In this case, the information data 127 are the virtual object data, the video data photographed by the camera unit 111, and data for display after processing, which are generated by the video processing unit 153.

The data managing unit 152 is configured to manage photographic video data photographed by the camera unit 111, the data on the virtual object, and the data for display after processing, which are generated by the video processing unit 153.

The control unit 125 is composed of a CPU (Central Processing Unit) including a processor dedicated to each arithmetic processing, such as a GPU (Graphics Processing Unit), and the like. The control unit 125 is configured to execute the program 126 memorized and stored in the memory 124 to control each functional block, thereby controlling an operation of the whole head mounted information processing apparatus 100. The program 126 is a program such as an OS (Operating System) of the head mounted information processing apparatus 100 and an application for controlling an operation.

The control unit 125 is configured to control the display control unit 151 to arrange and display a group of virtual objects arranged so as to be associated with the other real space than the first real space, for example, the group of second virtual objects arranged so as to be associated with the second real space in the first real space in accordance with virtual object display instruction information inputted from the operational input interface 121. This makes it possible to visually recognize and operate a group of virtual objects arranged so as to be associated with the other real space than the first real space.

In this regard, when the group of virtual objects generated by the virtual object generation processing unit 155 is displayed in a display visual field of the display 122, for example, an entire celestial sphere image indicating the entire surrounding landscape from the head mounted information processing apparatus 100 is projected and reflected on the display 122, and a group of virtual objects is arranged at predetermined positions of the entire celestial sphere image thus reflected.

In this case, the control unit 125 controls the display control unit 151 to arrange the group of first virtual objects and a group of virtual objects arranged so as to be associated with another real space other than the first real space, for example, the group of second virtual objects arranged so as to be associated with the second real space in the first real space, and display them.

Further, the control unit 125 may in turn switch between the group of first virtual objects and the group of second virtual objects arranged so as to be associated with the second real space, and display them on a display screen of the display 122.

Moreover, the control unit 125 may arrange and display the group of first virtual objects and a group of virtual objects arranged so as to be associated with another real space other than the first real space on a display screen of the display from visual field positions in the first real space.

Further, the control unit 125 may reduce the respective display screens illustrating the groups of virtual objects arranged so as to be associated with the corresponding real space to display multiple display screens side by side; return the display screen of the group of virtual objects in the selected real space to a normal size to display the display screen; and allow the user to visually recognize and operate a desired virtual object arranged in the selected real space.

Alternatively, the control unit 125 may control scaling (enlargement or reduction) or an operation of posture of a virtual object that is arranged in the display visual field and is hardly recognized visually so that the entire shape of the virtual object can be visually recognized by the virtual object posture operation processing unit, and display the virtual object after the posture operation by using the display control unit 151.

The memory 124 is a nonvolatile memory exemplified as a flash memory, and stores various kinds of the program 126 and the information data 127 to be used by the control unit 125. The information data 127 are data such as data on the groups of virtual objects, coordinate position information of the groups of virtual objects, and photographic images.

The display 122 is composed of a liquid crystal panel or the like, and is configured to display virtual objects, a photographic image of a real space, and the like. Further, the display 122 is configured to display, on the display screen, the display content such as presentation notification information to the user and an operation state.

For example, when the photographic image photographed by the camera unit 111 or the virtual object is displayed, the photographic image or the virtual object is arranged and displayed at a predetermined position on the entire celestial sphere image that indicates the entire surrounding landscape of the head mounted information processing apparatus 100. Further, the display 122 is configured to multi-display groups of virtual objects respectively associated with a plurality of real spaces in the display screen.

The right eye visual line detecting unit 112 is configured to detect a visual line of a right eye of the user. The left eye visual line detecting unit 113 is configured to detect a visual line of a left eye of the user. Note that a well-known technique generally used as an eye tracking process may be used for a process of detecting a visual line.

For example, in a method using corneal reflection, there is known a technique in which a face is irradiated with an infrared ray LED (Light Emitting Diode) and is photographed by an infrared ray camera, a position (corneal reflection) of the reflected light generated by the infrared ray LED irradiation on a cornea is used as a reference point, and a visual line is detected on the basis of a position of a pupil with respect to a position of the corneal reflection.

The acceleration sensor 143 is a sensor for detecting acceleration that is a change in velocity per unit time, by which motion, vibration, and impact can be captured. The gyro sensor 144 is a sensor for detecting angular velocity in a rotation direction, by which a state of vertical, horizontal, and diagonal postures can be captured. Therefore, by using the acceleration sensor 143 and the gyro sensor 144, it is possible to detect motion of the head of the user equipped with the head mounted information processing apparatus 100.

The geomagnetic sensor 145 is a sensor for detecting magnetic force of the earth, by which a direction to which a body of the head mounted information processing apparatus 100 is facing can be detected. By using a 3-axis type that detects geomagnetism in a vertical direction in addition to those in a front-back direction and a horizontal direction as the geomagnetic sensor 145 to capture a change in the geomagnetism with respect to the motion of the head, it is also possible to detect the motion of the head.

These sensors allow to detect in detail motion and variation of the head mounted information processing apparatus 100 worn by the user.

The depth sensor 142 is configured to measure a distance to an object in a plane. For example, as the depth sensor 142, there is one in which reflection of an infrared ray or laser is used. However, it may be realized by the other method such as a method of obtaining distance information from parallax of images respectively photographed by a plurality of cameras whose installation positions are different from each other.

The control unit 125 can detect motion of a hand and motion of a body by analyzing the distance information obtained by the depth sensor 142. In order to analyze the motion of the hand and the motion of the body, information obtained from the image photographed by the camera unit 111 may be used together.

The stimulus generating unit 146 is configured to generate a stimulus that can be perceived by skin under the control of the control unit 125. The stimulus generating unit 146 is configured to convert notification information transmitted by the head mounted information processing apparatus 100 to the user into the stimulus that can be perceived by the skin.

The stimulus that can be perceived by the skin includes pressure, thermal sensing, cold sensing, and an electrical stimulus. The stimulus generating unit 146 can surely convey notification to the user by generating the stimulus that can be perceived by the skin on the head of the user to which the head mounted information processing apparatus 100 is closely worn.

The vibration generating unit 117 is a unit that generates vibration under the control of the control unit 125, and is composed of a vibrator, haptics, force feedback, or the like, for example. The vibration generating unit 117 is configured to convert the notification information to the user into vibration. The vibration generating unit 117 can surely convey the notification to the user by generating the vibration on the head of the user to which the head mounted information processing apparatus 100 is closely worn.

The outer peripheral sound microphone 118 and the vocalized sound microphone 119 are configured to respectively collect voice from the outside and user's own vocalization. The vocalized sound microphone 119 may be a voice input device such as a bone conduction microphone.

The headphone 120 is to be worn on ears of the user, and is configured to cause the user to listen to voice to the user. The headphone 120 can notify the user of the notification information by the voice. The headphone 120 may be a voice output device such as a speaker or a bone conduction earphone.

The operational input interface 121 is composed of a keyboard, key buttons, or a touch pad, for example, and is configured to set and input information that the user wants to input. The operational input interface 121 may be provided at a position where the user can carry out an input operation easily.

The operational input interface 121 may be configured to be separated from the body of the head mounted information processing apparatus 100 and be connected thereto by wire or wirelessly. As examples of an operational input device to be separated from the head mounted information processing apparatus 100, there are a space mouse, a controller device, and the like.

The space mouse is a three-dimensional space position input device using a gyro sensor, an acceleration sensor, or the like. The controller device is configured to detect a spatial position of the controller device itself worn on a body of the user from camera video photographing the body or information from various kinds of sensors embedded in the controller device, and input the spatial position.

The operational input interface 121 may cause the display 122 to display an input operation screen on the display screen thereof, and capture input operation information on the basis of a position on the input operation screen to which the visual line detected by the right eye visual line detecting unit 112 and the left eye visual line detecting unit 113 is facing.

The operational input interface 121 may capture the input operation information by displaying a pointer on the input operation screen and causing the user to operate the pointer via the operational input interface 121. Further, the user may output voice indicating an input operation, and the operational input interface 121 may collect it by the vocalized sound microphone 119 to capture input operation information.

By using the vocalization or the display as the input operation in this manner, it is possible to further improve usability of the head mounted information processing apparatus worn on the head.

The configuration described above allows the head mounted information processing apparatus 100 to display the group of virtual objects arranged so as to be associated with another real space other than the first real space, for example, the group of second virtual objects arranged so as to be associated with the second real space in the first real space so as to overlap with the group of first virtual objects in accordance with a virtual object display request instruction, inputted via the operational input interface 121, for instructing display of the virtual object, or display the group of first virtual objects or the group of second virtual objects so as to be switched therebetween.

Further, by displaying all groups of virtual objects including the group of virtual objects, which is present in another real space, in the visual field positions of the first real space, it is possible to facilitate browse and an operation of the virtual object that is present in another real space. Moreover, in a case where the number of groups of virtual objects is large, it is possible to solve a problem that the user does not know in which real space the target virtual object is present.

Further, it becomes possible to operate the virtual object arranged in the other real space without moving from the real space that the user is viewing. For example, in a case where a user confirms or writes his or her schedule in another real space B in a state where a calendar is arranged on a wall of a real space A as a virtual object, the user can browse and operate the calendar as the virtual object without moving to the real space A.

This example is a deformation operation against the calendar that is the virtual object, and is processed by the virtual object deformation operation processing unit 156. A result of the deformation operation by the virtual object deformation operation processing unit 156 is reflected to the original object. Therefore, for example, when a schedule Z is written from the real space B to the calendar on the wall of the real space A as the deformation operation, the written schedule Z can also be recognized visually even though the user views the actual calendar on the wall of the real space A.

<Operation Example of Head Mounted Information Processing Apparatus>

Subsequently, an operation of the head mounted information processing apparatus 100 will be described.

Figure 2:
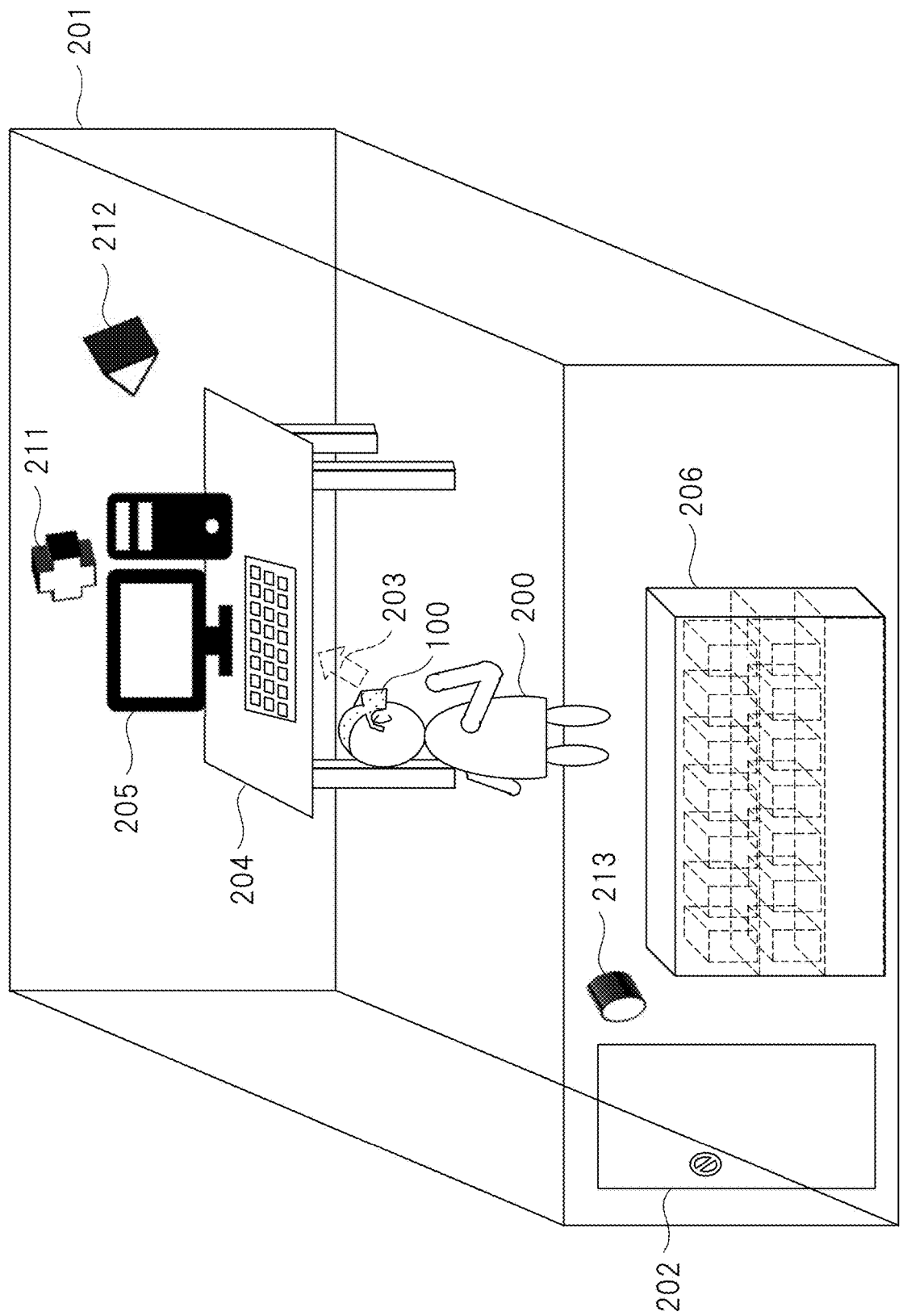
FIG. 2 is an explanatory drawing illustrating one example of a panoramic view of the surroundings of a usage situation in the head mounted information processing apparatus illustrated in FIG. 1.
Figure 3:
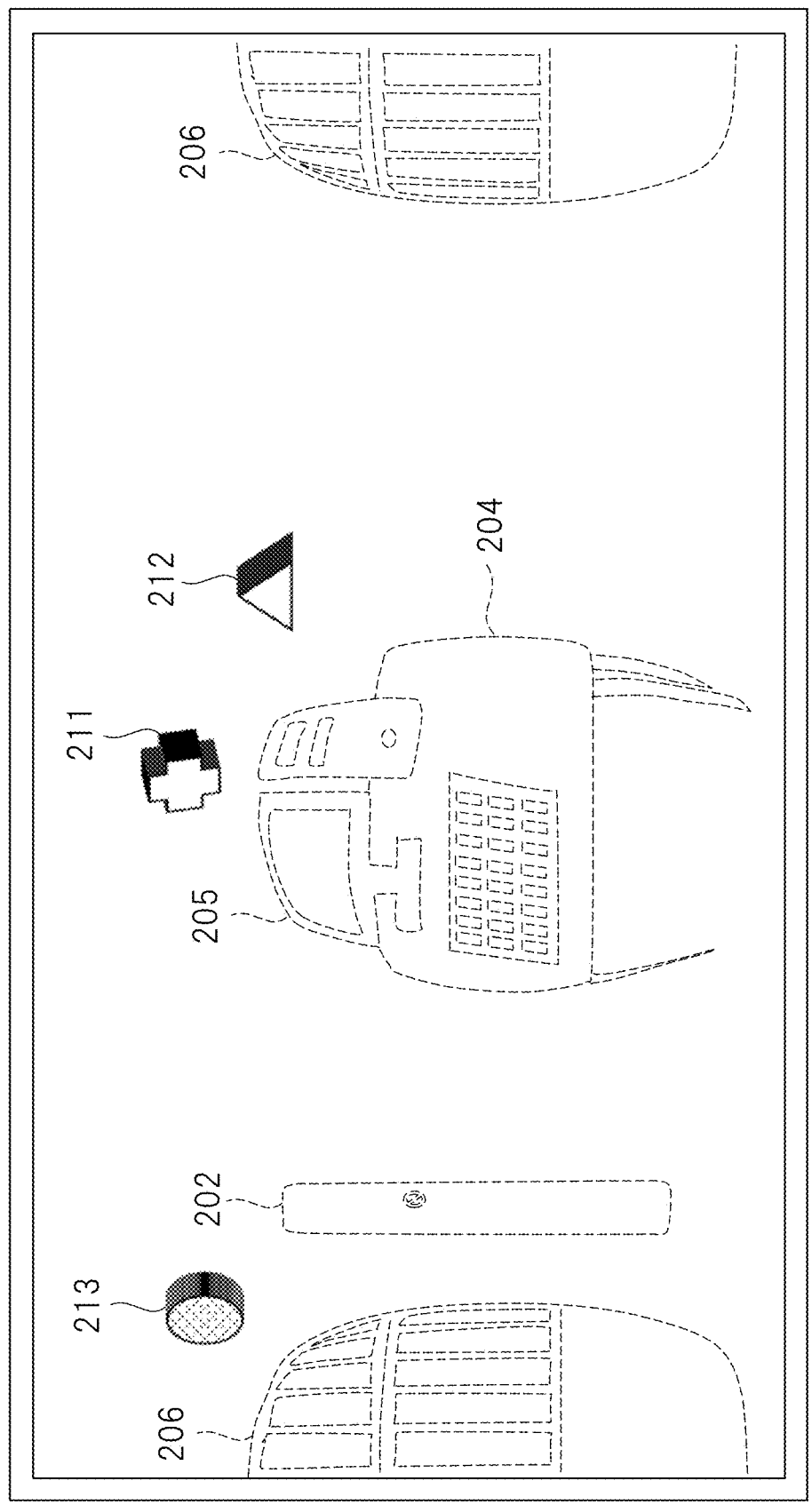
FIG. 3 is an explanatory drawing illustrating one example of display of a list of a group of virtual objects by the head mounted information processing apparatus illustrated in FIG. 1.

FIG. 2 is an explanatory drawing illustrating one example of a panoramic view of the surroundings of a usage situation in the head mounted information processing apparatus 100 illustrated in FIG. 1. FIG. 3 is an explanatory drawing illustrating one example of display of a list of a group of virtual objects by the head mounted information processing apparatus 100 illustrated in FIG. 1. FIG. 3 illustrates a display example when the group of virtual objects display as a list is arranged so as to fall within the display screen of the display 122 in the panoramic view of the surroundings of the usage situation illustrated in FIG. 2.

In FIG. 2, a user 200 who wears the head mounted information processing apparatus 100 is positioned at the center of a first room 201, and is in a state of viewing a direction 203 opposite to a rear entrance door 202.

A desk 204 and a personal computer 205 are placed on a front side of the user 200, and a bookshelf 206 is placed on a back side of the user 200. Virtual objects 211 to 213 are a group of first virtual objects, and are generated by the virtual object generation processing unit 155.

The virtual object 211 is arranged in front of the user 200. The virtual object 212 is arranged on a right side of the desk 204. The virtual object 213 is arranged on a right side of the bookshelf 206 behind the user 200.

In panoramic view of the surroundings state of the first room 201 illustrated in FIG. 2, the user 200 visually recognizes a first real space projected in the direction 203 of the first room 201 by visually observing the first real space directly or displaying a real image photographed by the camera unit 111 on the display 122.

As illustrated in FIG. 3, with respect to visual recognition of the group of first virtual objects, the virtual objects 211 to 213 are displayed in a list. In this list display, the entire celestial sphere image photographed by the camera unit 111 is projected and reflected on the display screen of the display 122, and all the virtual objects are displayed on the entire celestial sphere image thus projected and reflected. At this time, the virtual objects 211 to 213 are respectively arranged at predetermined positions.

The display control unit 151 causes the display 122 to display the virtual objects 211 to 213 on the basis of data read out by the data managing unit 152. The data managing unit 152 reads out shape data and arrange coordinate data of the virtual objects 211 to 213, which are stored in the memory 124 as the information data 127, and outputs them to the display control unit 151. At that time, the virtual object posture operation processing unit 154 executes a posture operation for the virtual objects as needed.

This makes it possible for the user to visually recognize all the virtual objects that exist in the panoramic view of the surroundings together with existence positions thereof.

Note that portions illustrated by dotted lines in FIG. 3 are photographic objects, thereby intelligibly illustrating a positional relationship between the photographic objects and the virtual objects. Therefore, it is not necessary to display the photographic object illustrated by this dotted line.

Figure 4:
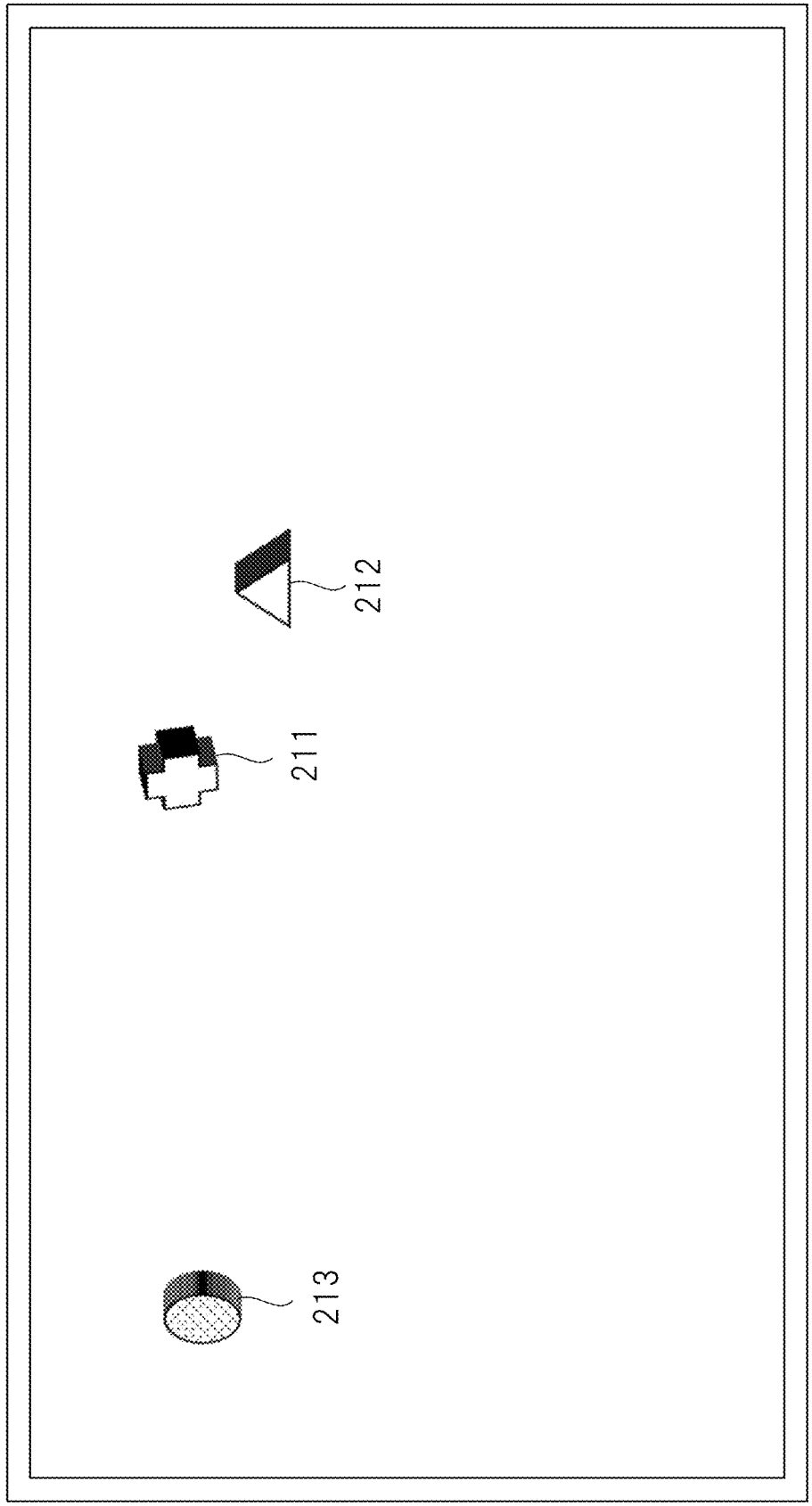
FIG. 4 is an explanatory drawing illustrating another example of the display of the list of the group of virtual objects illustrated in FIG. 3.

FIG. 4 is an explanatory drawing illustrating another example of display of a list of the group of virtual objects illustrated in FIG. 3. FIG. 4 illustrates an example in which the photographic objects illustrated by the dotted line is not displayed and only the virtual objects 211 to 213 are displayed.

Figure 5:
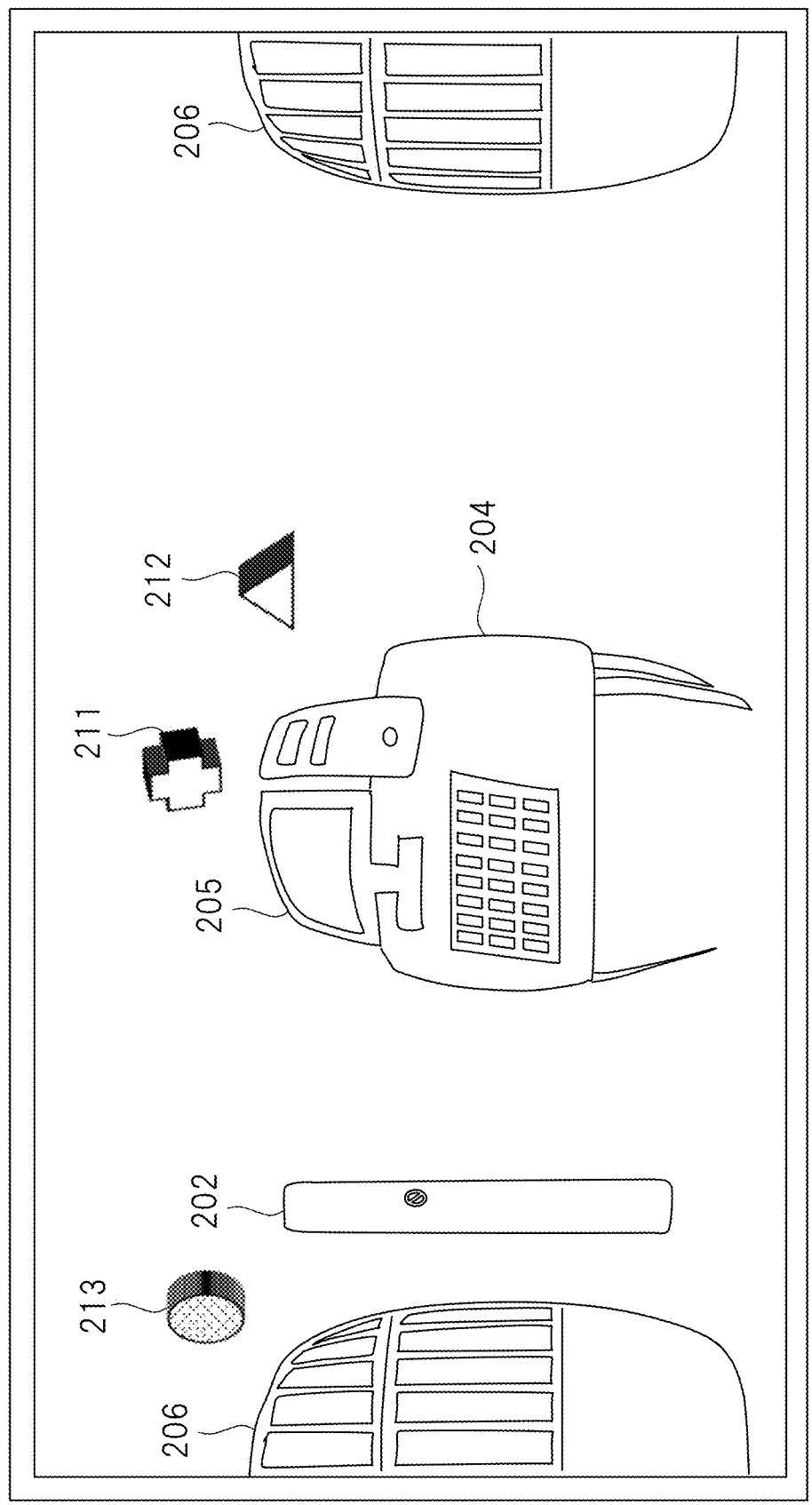
FIG. 5 is an explanatory drawing illustrating still another example of the display of the list of the group of virtual objects illustrated in FIG. 4.

FIG. 5 is an explanatory drawing illustrating still another example of the display of the list of the group of virtual objects illustrated in FIG. 4. When all the virtual objects existing in the panoramic view of the surroundings are to be displayed, as illustrated in FIG. 5, the photographic objects including the desk 204, the personal computer 205, and the bookshelf 206, which are illustrated by the dotted lines in FIG. 3, may be displayed as background images. This makes it possible to more easily recognize the positional relationship between the desk 204, the personal computer 205, and the bookshelf 206 in the real space and the virtual objects 211 to 213.

For example, as illustrated in FIG. 2, in a case where the virtual object 213 is provided on an upper right side of the bookshelf 206 on the back side, it is possible to easily recognize the positions of the virtual objects so long as the bookshelf 206 is displayed on a lower left side of the virtual object 213 as a background image.

As described above, the display control unit 151 generates the data for displaying the virtual objects and the like, and causes the display 122 to display the virtual objects. The display control unit 151 reads, from the memory 124, data on shapes and display positions of the objects contained in the information data 127, background video photographed by the camera unit 111, data generated by the video processing unit 153, and the like, and generates display data from the read data.

Further, the virtual object posture operation processing unit 154 executes the posture operation for the virtual objects as needed, and adjusts a display position, a size, and a shape thereof so that each of the virtual objects is to be displayed at a corresponding position on the screen. This adjustment is executed by the virtual object posture operation processing unit 154 on the basis of commands of the program 126 stored in the memory 124.

Note that the entire celestial sphere image that indicates the entire surrounding landscape may be obtained by using the entire solid angle and the entire celestial sphere camera that can photograph an image of the entire celestial sphere at one time. Alternatively, a plurality of images photographed by a camera with a normal angle of view may be joined by the video processing unit 153 to generate the entire celestial sphere image.

Further, an image of only a part of a range that can be obtained may be used for display of a landscape image. For example, it is a case where existence of almost all the virtual objects can be visually recognized not by the entire celestial sphere but by a part of a range of an image such as a hemispherical image of the upper half of the entire solid angle.

Figure 6:
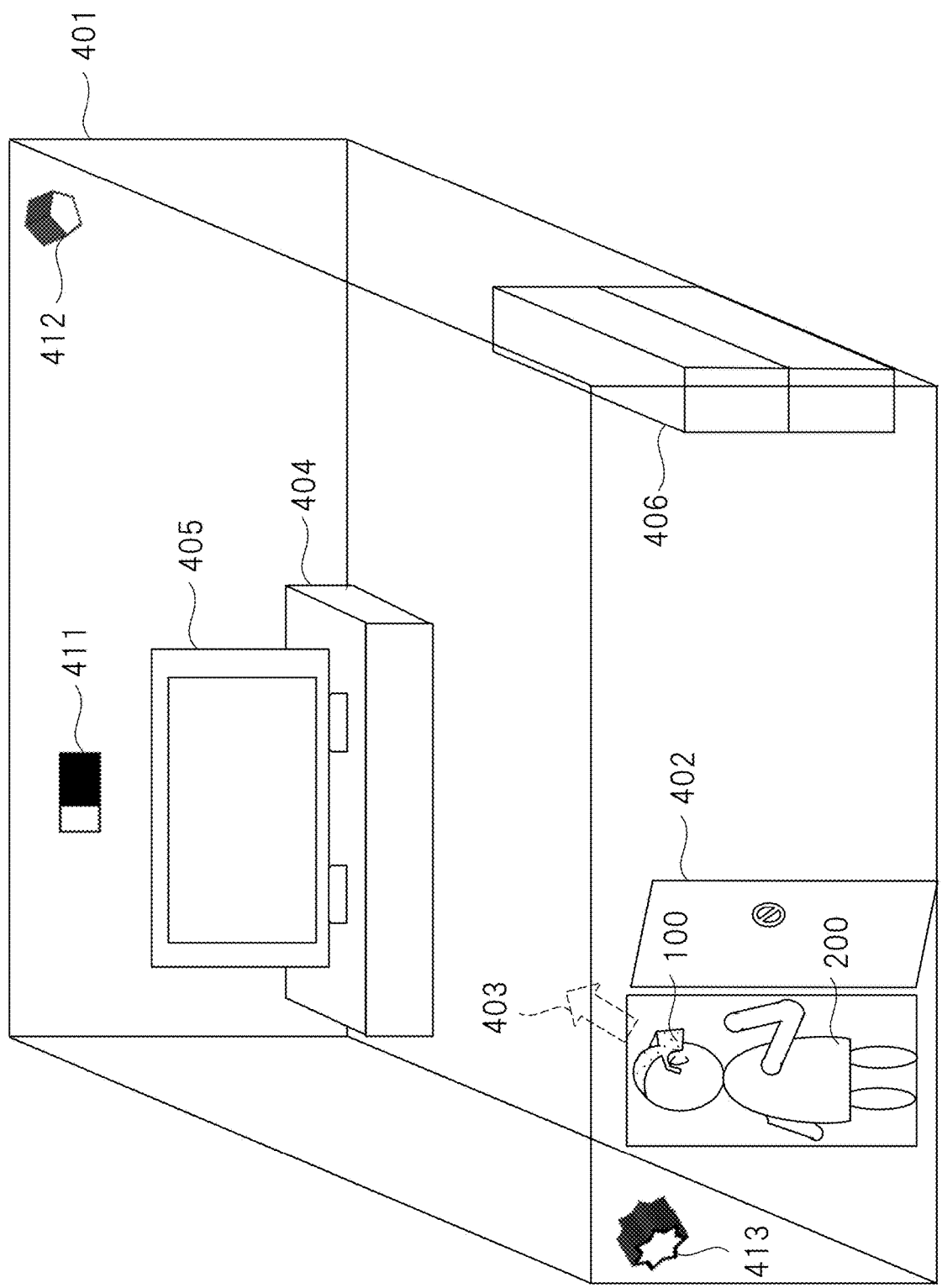
FIG. 6 is an explanatory drawing illustrating one example of a usage situation in the head mounted information processing apparatus illustrated in FIG. 1.
Figure 7:
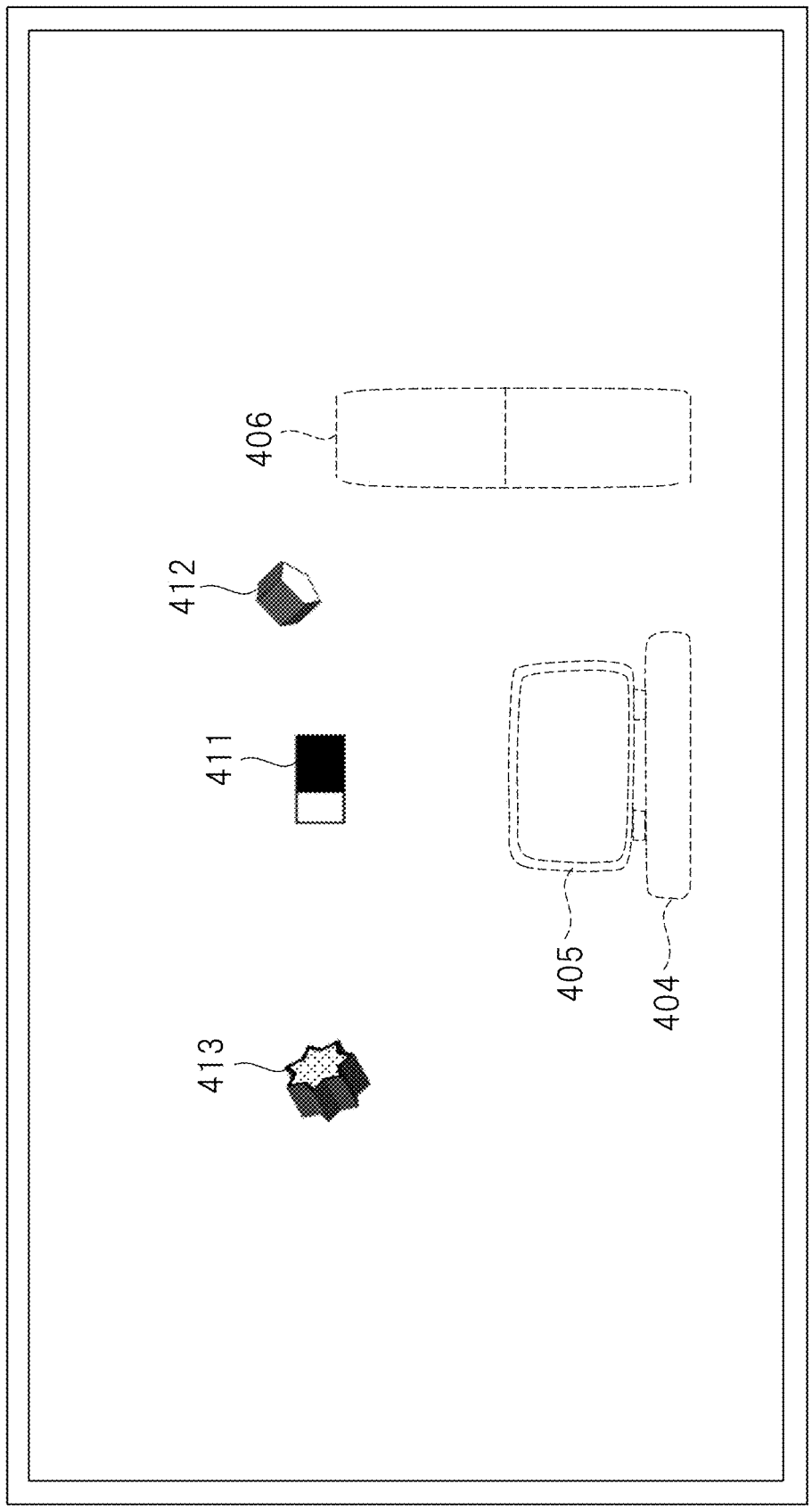
FIG. 7 is an explanatory drawing illustrating one example of a display screen of the group of virtual objects displayed in a list in the example of the panoramic view of the surroundings illustrated in FIG. 6.

FIG. 6 is an explanatory drawing illustrating one example of a usage situation in the head mounted information processing apparatus 100 illustrated in FIG. 1. FIG. 7 is an explanatory drawing illustrating one example of a display screen of the group of virtual objects displayed in a list in the example of the panoramic view of the surroundings illustrated in FIG. 6.

FIG. 6 illustrates a state where the user 200 who wears the head mounted information processing apparatus 100 is positioned in the vicinity of an entrance door 402 of a second room 401 and views an indoor direction 403 of the second room 401. Further, a television stand 404 and a television 405 are installed on a front side of the user 200. A shelf 406 is installed on a wall on a right side when viewed from the user 200.

The group of second virtual objects generated by the virtual object generation processing unit 155 is composed of virtual objects 411 to 413. In FIG. 7, the virtual object 411 is positioned on a rear upper side of the television 405. The virtual object 412 is positioned on a rear right side of the television 405. The virtual object 413 is positioned in the vicinity of the wall on a left side of the entrance door 402.

In the panoramic view of the surroundings of the second room 401 illustrated in FIG. 6, the user 200 directly observes the second real space projected in the indoor direction 403 visually, or visually recognizes an image of the real space photographed by the camera unit 111 and displayed on the display 122.

With respect to the visual recognition of the group of second virtual objects, as illustrated in FIG. 7, an entire celestial sphere image indicating the entire surrounding landscape is projected and reflected on the display screen of the display 122, and the respective virtual objects 411 to 413 are arranged at predetermined positions in the entire celestial sphere image thus projected and reflected to be displayed in a list.

This makes it possible for the user to visually recognize existence of all the virtual objects existing in the panoramic view of the surroundings together with existence positions thereof in the similar manner to the case illustrated in FIG. 3. Further, when all the virtual objects existing in the whole panoramic view of the surroundings are to be displayed, the photographic objects such as the television stand 404, the television 405, and the shelf 406, which are illustrated in FIG. 7 by the dotted lines, may be displayed as background images.

This makes it possible to easily recognize the positional relationship between the real spaces and the virtual objects. In this regard, since the process of displaying them on the display 122 is similar to that illustrated in FIG. 3, explanation thereof will be omitted.

Figure 8:
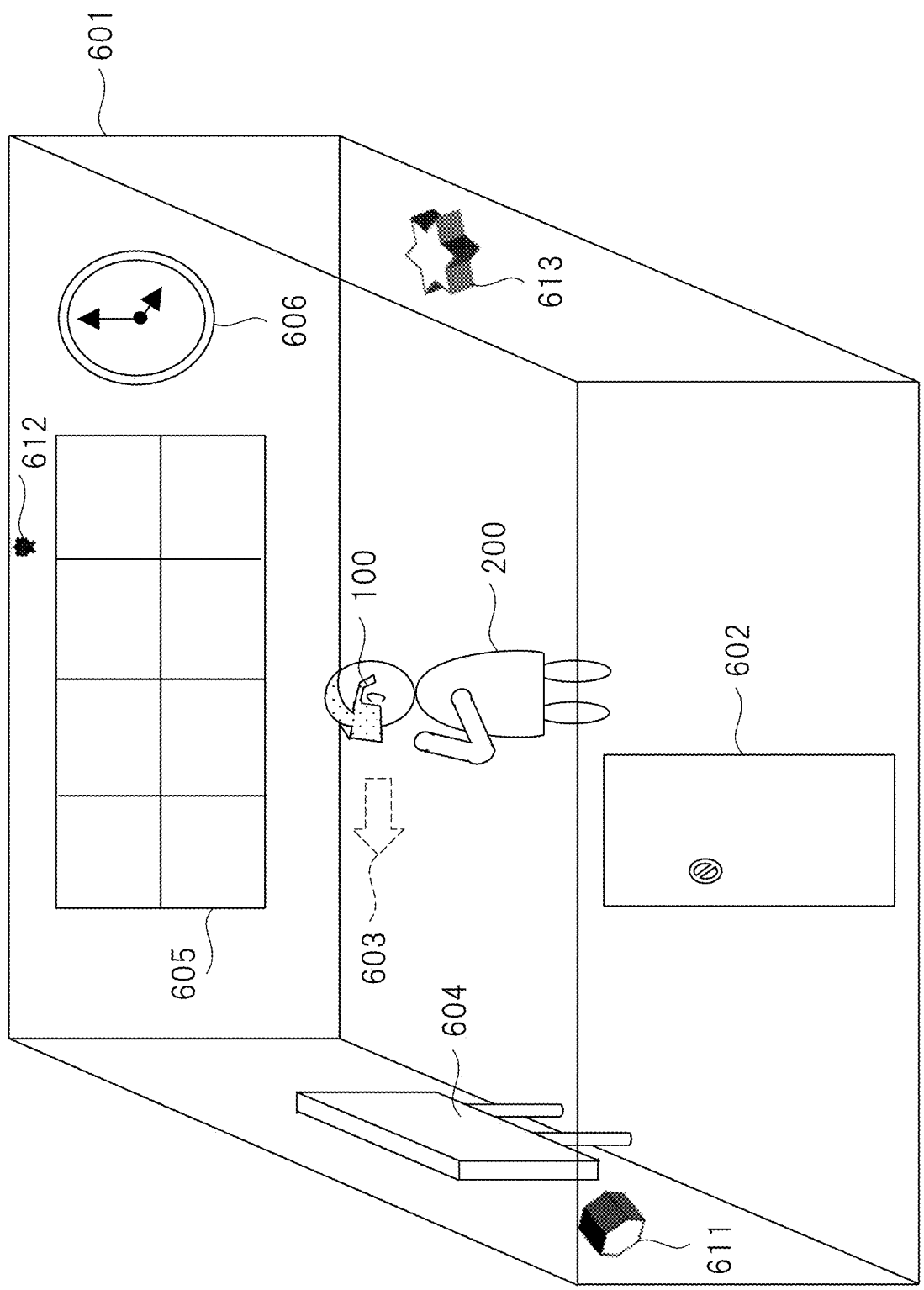
FIG. 8 is an explanatory drawing illustrating another example of the usage situation illustrated in FIG. 6.
Figure 9:
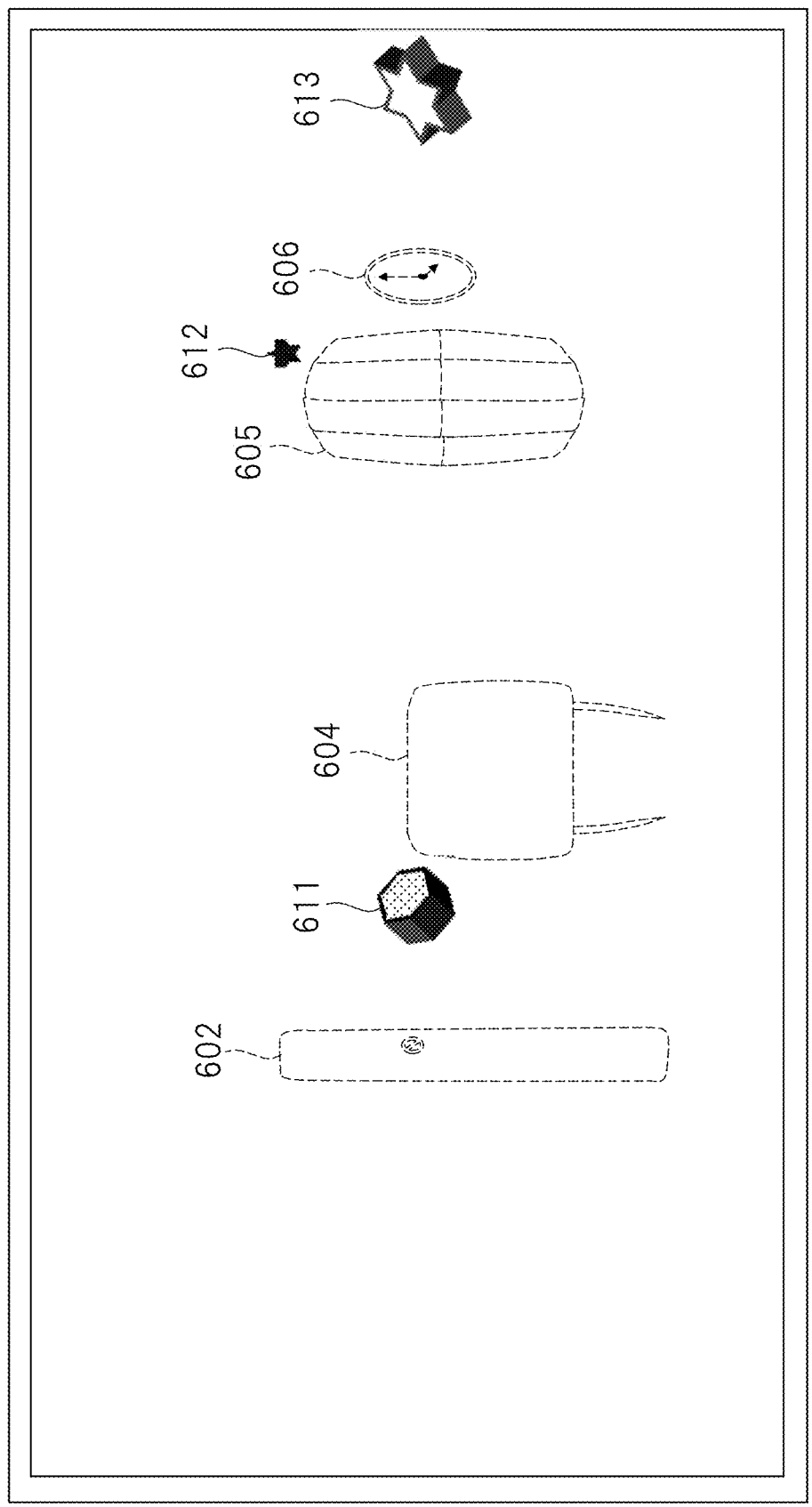
FIG. 9 is an explanatory drawing illustrating one example of a display screen of a group of virtual objects displayed in a list in the example of the panoramic view of the surroundings illustrated in FIG. 8.

FIG. 8 is an explanatory drawing illustrating another example of the usage situation illustrated in FIG. 6. FIG. 9 is an explanatory drawing illustrating one example of a display screen of the group of virtual objects displayed in a list in the example of the panoramic view of the surroundings illustrated in FIG. 8. FIG. 8 illustrates a state where the user 200 who wears the head mounted information processing apparatus 100 is positioned in the center of a third room 601 and is viewing a left lateral direction 603 behind an entrance door 602. A board 604 is positioned in front of the user 200, and a window 605 is positioned on a right side of the user 200. Further, a clock 606 is arranged on a right side of the window 605.

The group of third virtual objects generated by the virtual object generation processing unit 155 is composed of virtual objects 611 to 613. In FIG. 8, the virtual object 611 is positioned on a left side of the board 604, and the virtual object 612 is positioned above the window 605. The virtual object 613 is positioned behind the user 200.

In the panoramic view of the surroundings state in the third room 601 illustrated in FIG. 8, the user 200 directly observes the third real space projected in the direction 603 visually, or visually recognizes the image of the real space photographed by the camera unit 111 and displayed on the display 122.

With respect to the visual recognition of the group of third virtual objects, as illustrated in FIG. 9, the entire celestial sphere image indicating the entire surrounding landscape is projected and reflected on the display screen of the display 122, and the respective virtual objects 611 to 613 are arranged at positions where they exist in the entire celestial sphere image thus projected and reflected to be displayed in a list.

This makes it possible for the user to visually recognize existence of all the virtual objects existing in the panoramic view of the surroundings together with existence positions thereof in the similar manner to those illustrated in FIG. 3 and FIG. 7. Further, when all the virtual objects existing in the whole panoramic view of the surroundings are to be displayed, the photographic objects such as the board 604, the window 605, and the clock 606, which are illustrated in FIG. 9 by the dotted lines, may be displayed as background images.

This makes it possible to easily recognize the positional relationship between the real spaces and the virtual objects. In this regard, since the process of displaying them on the display 122 is similar to that illustrated in FIG. 3, explanation thereof will be omitted.

Figure 10:
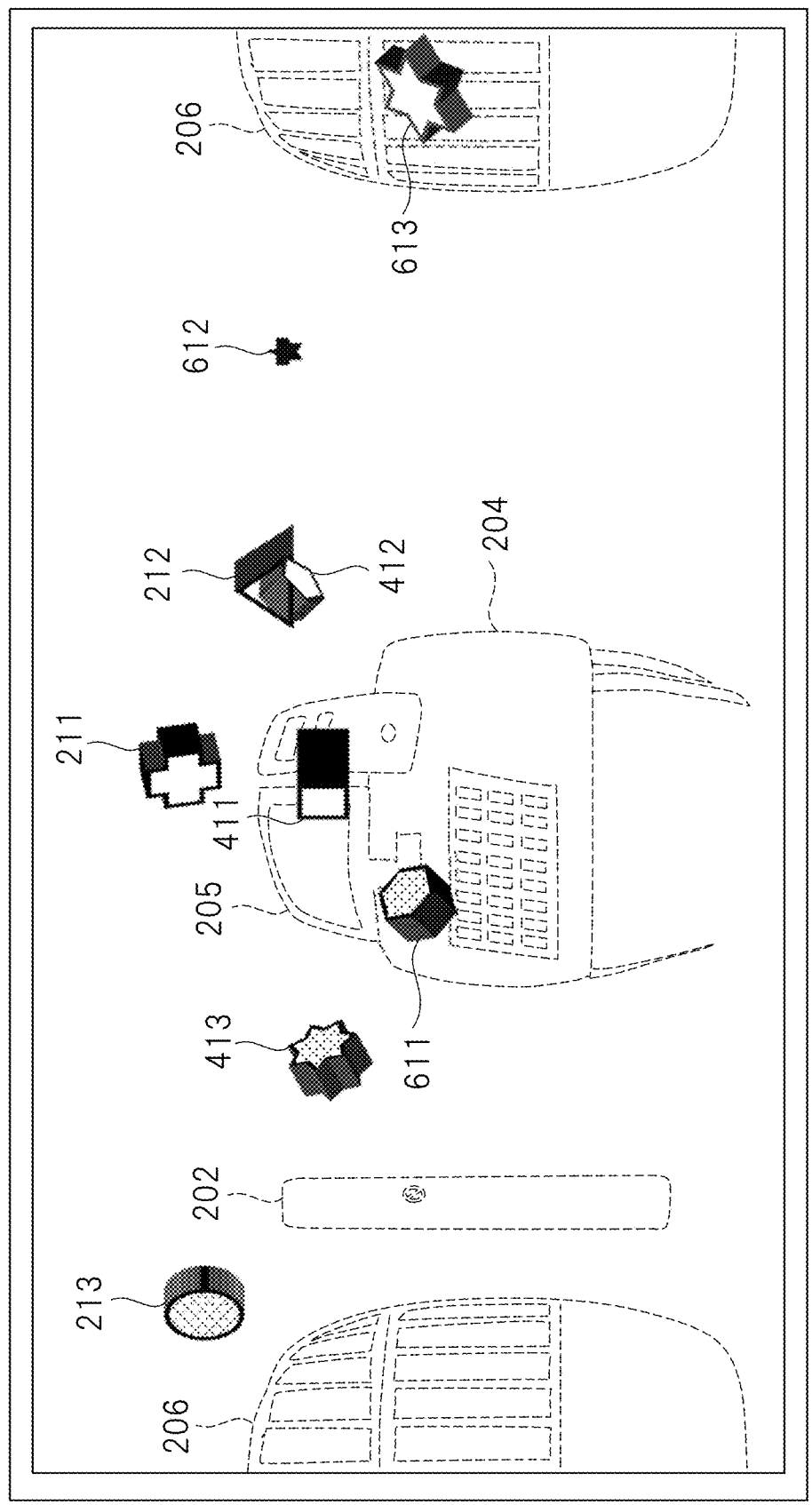
FIG. 10 is an explanatory drawing illustrating one example of display of the group of virtual objects by the head mounted information processing apparatus illustrated in FIG. 1.

FIG. 10 is an explanatory drawing illustrating one example of display of the group of virtual objects by the head mounted information processing apparatus illustrated in FIG. 1. In the examples illustrated in FIG. 3, FIG. 7, and FIG. 9, the groups of virtual objects respectively arranged so as to be associated with the real spaces are visually recognized in the respective real spaces. However, in these examples, the group of virtual objects arranged so as to be associated with another real space other than the real space that is being projected currently cannot be visually recognized in the real space currently projected.

FIG. 10 describes a display example in which the respective groups of virtual objects arranged so as to be associated with the real spaces are arranged on the display screen of the display 122 so as to overlap with each other while keeping the visual field positions of the real spaces.

Since the portions illustrated in FIG. 3, FIG. 7, and FIG. 9 to which the same reference numerals are respectively assigned in FIG. 10 have the similar operations as the operations that have already been described in FIG. 3, FIG. 7, and FIG. 9, detailed explanation thereof will be omitted.

FIG. 10 illustrates a state where the group of second virtual objects arranged so as to be associated with the second real space and the group of third virtual objects arranged so as to be associated with the third real space are displayed in the first real space currently projected on the display screen of the display 122 so as to overlap with each other in addition to the group of first virtual objects arranged so as to be associated with the first real space.

The group of first virtual objects is composed of the virtual objects 211, 212, and 213. The group of second virtual objects is composed of the virtual objects 411, 412, and 413. The group of third virtual objects is composed of the virtual objects 611, 612, and 613.

As illustrated in FIG. 10, by arranging and displaying the virtual objects 411 to 413, and 611 to 613 arranged in the other real spaces in the real space currently present so as to overlap with each other, it is possible to visually recognize all the virtual objects arranged so as to be associated with the other real spaces without switching the real spaces.

This makes it possible to visually recognize a desired virtual object easily from the display screen on which all virtual objects are displayed even though there are a large number of real spaces and groups of virtual objects. Moreover, it becomes possible to easily carry out a desired operation such as modification of the selected virtual object. As a result, it is possible to improve usability.

The above operation is to be displayed on the display 122 by the display control unit 151. Further, the virtual object posture operation processing unit 154 executes a posture operation for any virtual object as needed.

The virtual object posture operation processing unit 154 adjusts a display position, a size, a shape, and the like so that a virtual object is displayed at a corresponding position on the screen in accordance with an instruction of the program 126 stored in the memory 124. The display control unit 151 generates display data from the data adjusted by the virtual object posture operation processing unit 154 to display it on the display 122.

Figure 11:
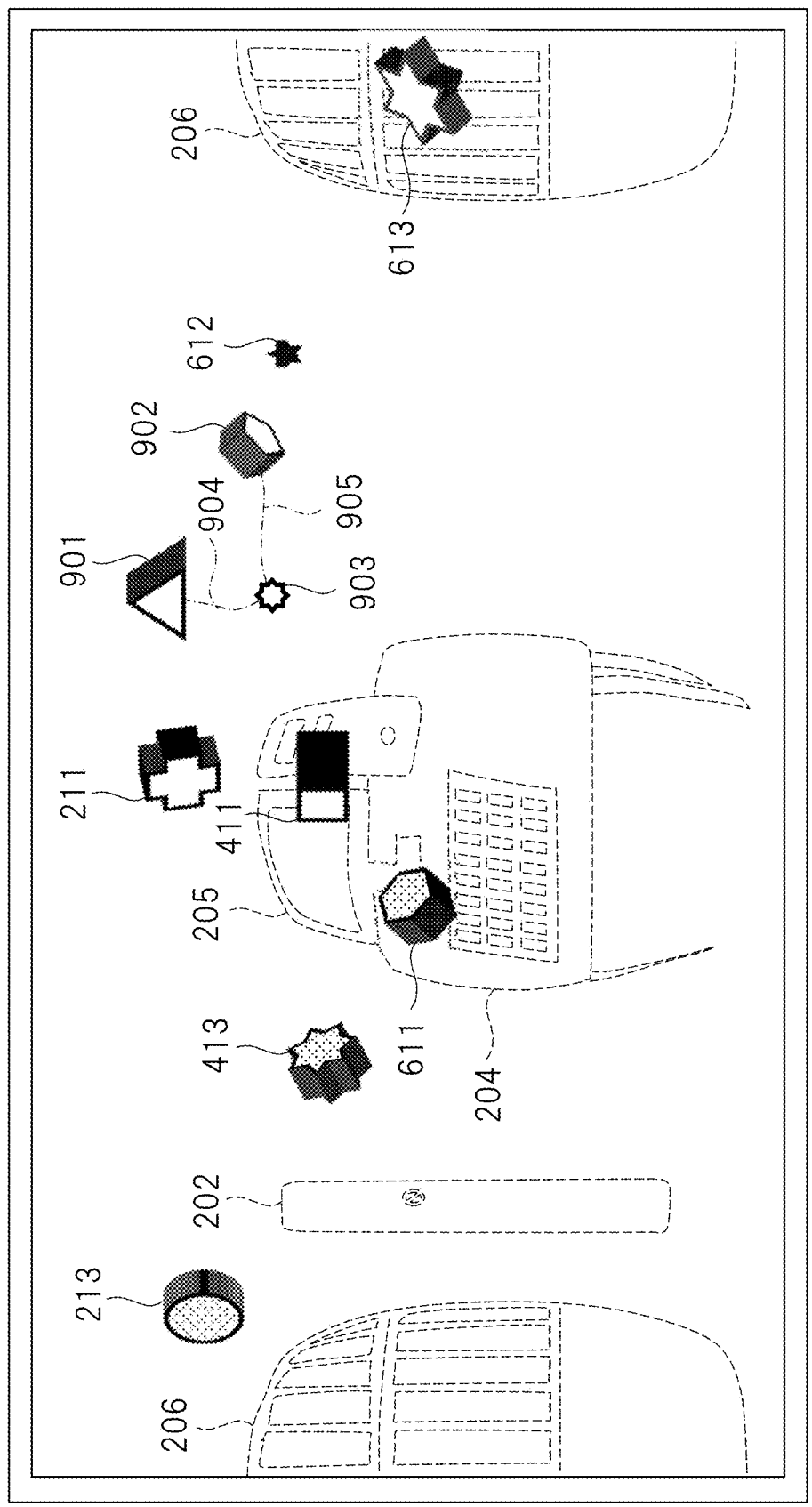
FIG. 11 is an explanatory drawing illustrating another example of the display of the group of virtual objects illustrated in FIG. 10.

FIG. 11 is an explanatory drawing illustrating another example of the display of the group of virtual objects illustrated in FIG. 10. FIG. 11 illustrates an example in which virtual objects displayed on the display screen of the display 122 are arranged at substantially the same coordinate positions and the virtual objects are thereby displayed so as to overlap with each other.

Since the portions illustrated in FIG. 2, FIG. 3, FIG. 6, FIG. 7, FIG. 8, FIG. 9, and FIG. 10 to which the same reference numerals are respectively assigned in FIG. 11 have the similar operations to the operations that have already been described in FIG. 2, FIG. 3, FIG. 6, FIG. 7, FIG. 8, FIG. 9, and FIG. 10, detailed explanation thereof will be omitted.

The virtual objects 212 and 412 illustrated in FIG. 10 are virtual objects that are arranged and overlap with each other at substantially the same coordinate position, and the overlap reduces visibility. Therefore, as illustrated in FIG. 11, the virtual objects 212 and 412 to be displayed so as to overlap with each other are displayed by shifting virtual objects 901 and 902 to coordinate positions where they do not overlap with each other.

Further, a mark 903 is displayed at the original coordinate position where the virtual objects 212 and 412 are arrange, and virtual lines 904 and 905 are respectively displayed so as to connect to each other between the virtual objects 901 and 902 and the mark 903 that are arranged and displayed by shifting the coordinate positions.

Thus, by shifting the virtual objects arranged and displayed so as to overlap with each other at substantially the same position and displaying them in this manner, it is possible to display virtual objects without overlapping with each other. Further, by displaying the mark 903, it is possible to easily recognize the original position where the virtual object is arranged. Moreover, by displaying the virtual lines 904 and 905, it is possible to further improve visibility of the virtual objects.

Further, instead of shifting the display position of the virtual object, the virtual objects that are arranged and displayed at the same position so as to overlap with each other may be displayed as a translucent image, that is, a transparent image.

The above operation is to be displayed on the display 122 by the display control unit 151. Further, the virtual object posture operation processing unit 154 executes a posture operation for any virtual object as needed.

The posture operation by the virtual object posture operation processing unit 154 is that a display position, a size, and a shape are adjusted on the basis of the program 126 stored in the memory 124 so that the virtual object is displayed at the corresponding position.

Hereinafter, unless otherwise specified, the display of the virtual object on the display 122 is subjected to the similar processing.

Further, the display of the group of virtual objects may be that the user selects a desired virtual object from the virtual objects 212 and 412 (FIG. 10) displayed so as to be superimposed with each other, and only the group of virtual objects similarly associated therewith is displayed in the real space arranged so as to be associated with the selected virtual object. In that case, the group of virtual objects arranged so as to be associated with the other virtual space is not displayed.

This makes it possible to easily select a next desired virtual object from the group of virtual objects arranged so as to be associated with the same real space as that of the desired virtual object.

<Switching Display Example of Group of Virtual Objects>

Figure 12:
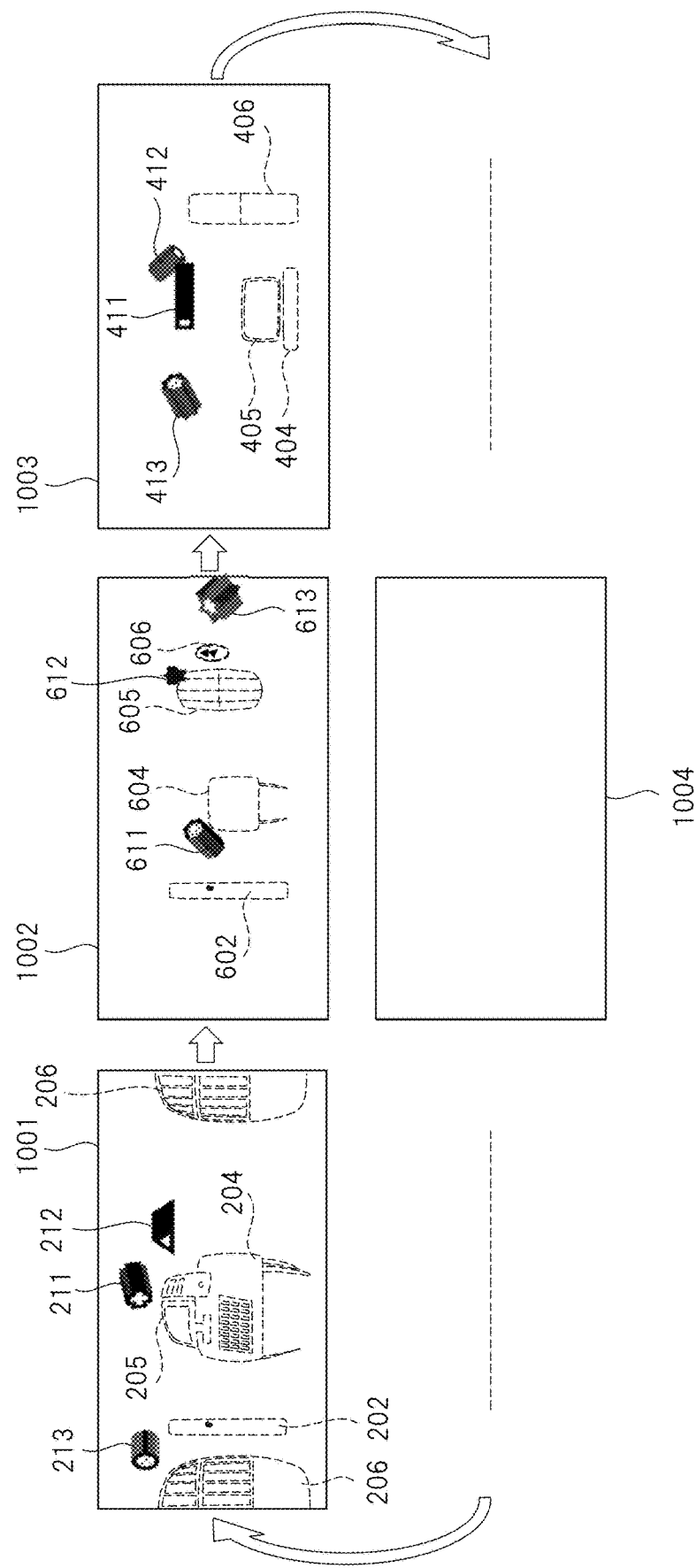
FIG. 12 is an explanatory drawing illustrating one example of switching display of the group of virtual objects by the head mounted information processing apparatus illustrated in FIG. 1.

FIG. 12 is an explanatory drawing illustrating one example of switching display of the group of virtual objects by the head mounted information processing apparatus 100 illustrated in FIG. 1. Since the portions illustrated in FIG. 2, FIG. 3, FIG. 6, FIG. 7, FIG. 8, FIG. 9, and FIG. 10 to which the same reference numerals are respectively assigned in FIG. 12 have the similar operations as the operations that have already been described in FIG. 2, FIG. 3, FIG. 6, FIG. 7, FIG. 8, FIG. 9, and FIG. 10, detailed explanation thereof will be omitted.

As illustrated in FIG. 11, FIG. 12 illustrates an example in which all the virtual objects are displayed so as not to overlap with each other, but groups of virtual objects arranged so as to be associated with respective real spaces are displayed so as to be switched in turn.

A display screen 1001 is a display screen on which a group of first virtual objects arranged so as to be associated with a first real space is first displayed. A display screen 1002 is a display screen on which a group of second virtual objects arranged so as to be associated with a second real space is displayed.

A display screen 1003 is a display screen on which a group of third virtual objects arranged so as to be associated with a third real space is displayed. A display screen 1004 is a display screen on which a group of virtual objects arranged so as to be associated with another real space different from the first to third real spaces is displayed in a case where there is such a group of virtual objects. These display screens 1001 to 1004 are displayed on the display 122 so as to be switched in turn.

This makes it possible to visually recognize only the group of virtual objects arranged so as to be associated with each of the real spaces in turn instead of visually recognizing all the groups of virtual objects at once. As a result, it is possible to visually recognize a desired virtual object from each of the groups of virtual objects efficiently, and it becomes possible to further improve visibility.

Further, in the switching display of the groups of virtual objects, they may be switched and displayed at regular intervals when they can be easily recognized visually by means of an input operation such as swiping from the operational input interface 121, for example. This makes it possible to further heighten the visibility of the virtual objects.

In a case where the user wants to take more time to visually recognize the virtual objects in detail or the user wants to switch to a next screen in a short time in the switching display of the virtual objects at regular intervals, increase or decrease of the time to visually recognize the group of virtual objects being viewed may be changed by means of an operation input of the operational input interface 121.

When each of the display screens 1001, 1002, and 1003 is displayed, not only the group of virtual objects but also the photographic image of the real space corresponding to the group of virtual objects may be displayed as a background.

In this case, by displaying the background of the photographic image, it becomes possible to easily recognize the virtual objects. Note that the photographic background may be photographed by the camera unit 111 illustrated in FIG. 1 are stored in the memory 124. In a case where an angle of view of the camera unit 111 is narrow, images photographed separately may be brought together and used.

<Scaling and Posture Operation of Virtual Object>

Figure 13:
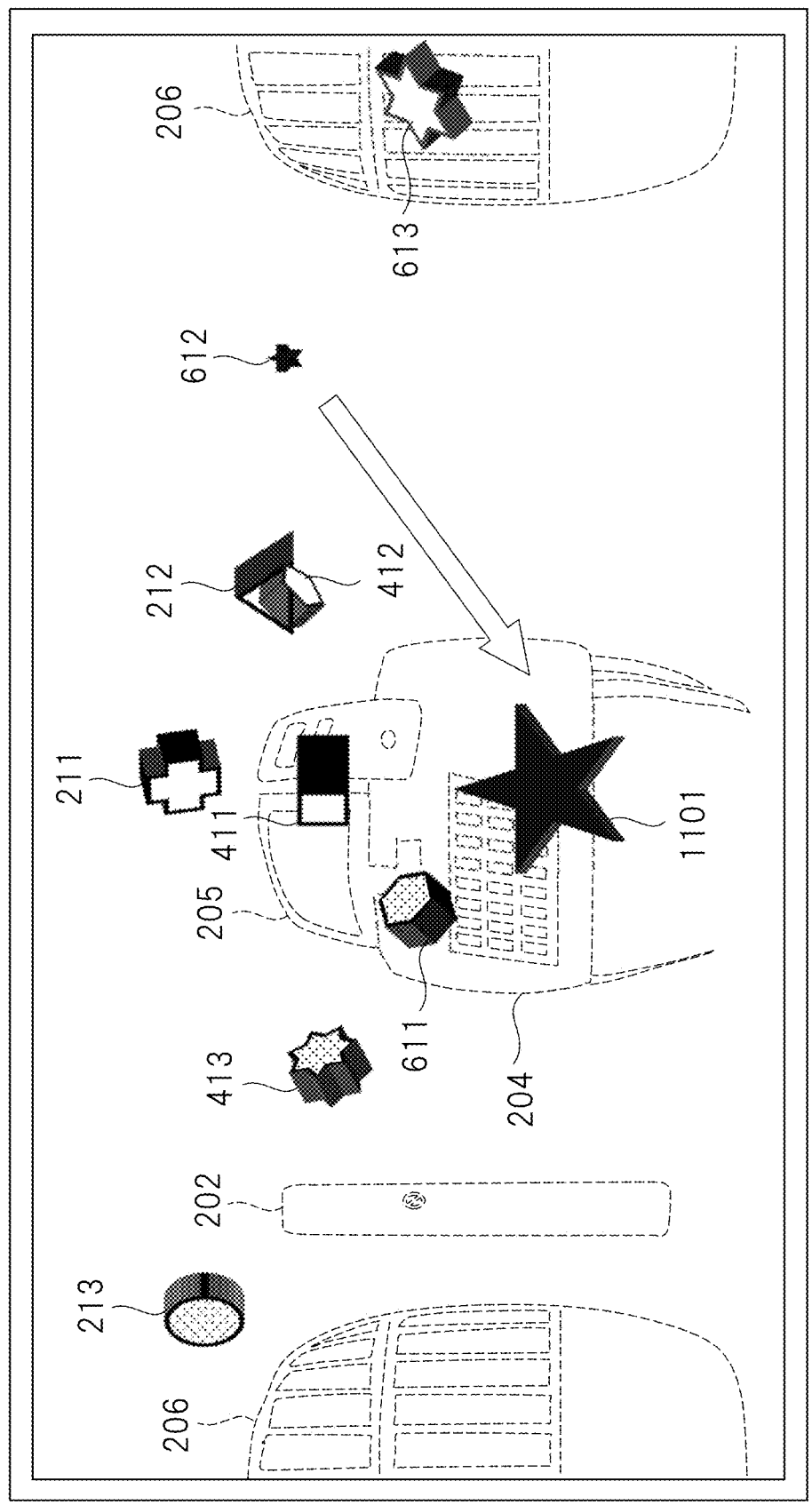
FIG. 13 is an explanatory drawing illustrating one example of scaling and a posture operation of the virtual object by the head mounted information processing apparatus illustrated in FIG. 1.
Figure 14:
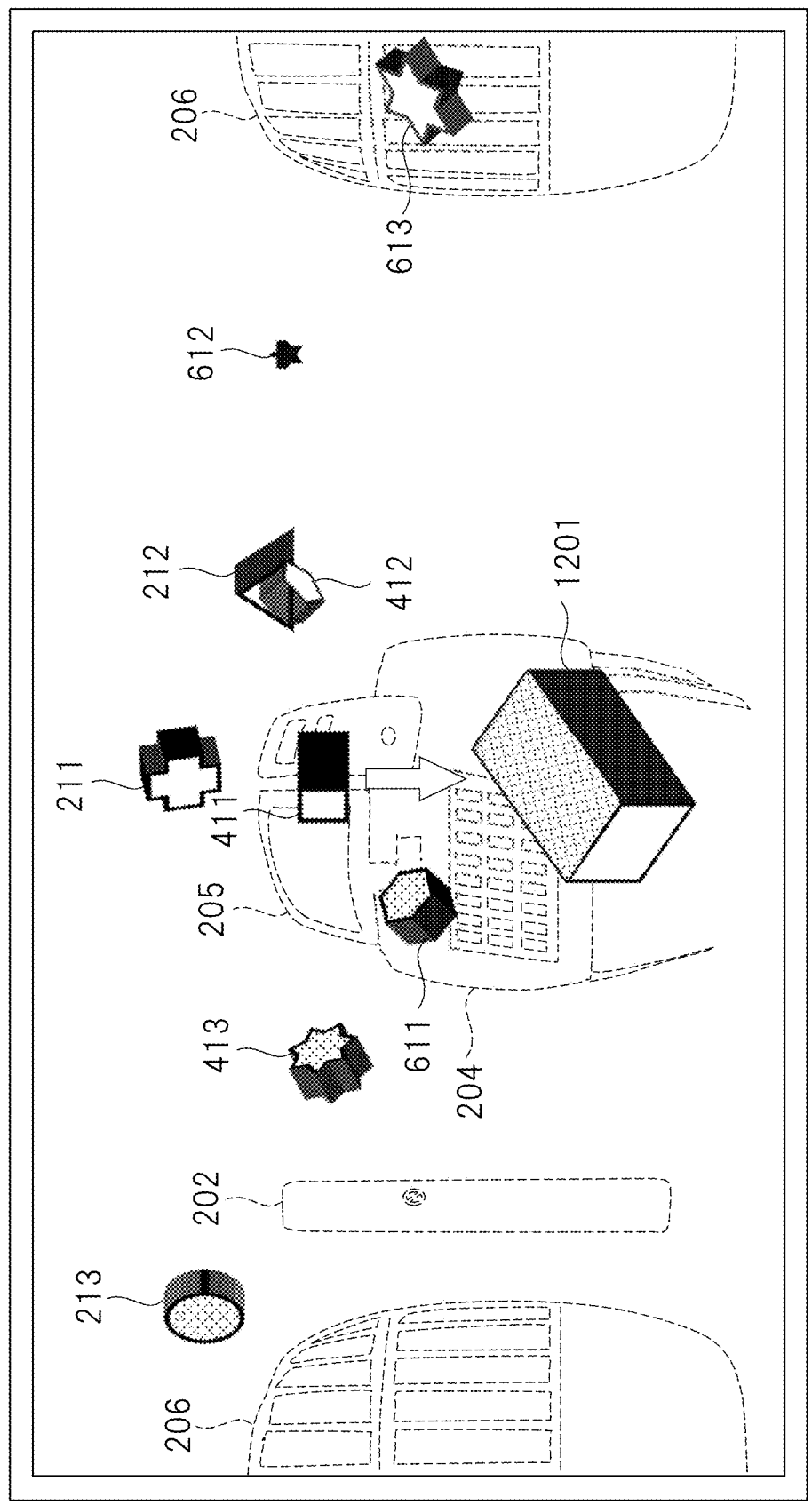
FIG. 14 is an explanatory drawing illustrating another example of FIG. 13.

Subsequently, an operation of the scaling and posture operation for the virtual objects by the head mounted information processing apparatus 100 will be described. FIG. 13 is an explanatory drawing illustrating one example of the scaling and posture operation for the virtual objects by the head mounted information processing apparatus illustrated in FIG. 1. FIG. 14 is an explanatory drawing illustrating another example of FIG. 13.

Since the portions illustrated in FIG. 2, FIG. 3, FIG. 6, FIG. 7, FIG. 8, FIG. 9, and FIG. 10 to which the same reference numerals are respectively assigned in FIG. 13 and FIG. 14 have the similar operations as the operations that have already been described in FIG. 2, FIG. 3, FIG. 6, FIG. 7, FIG. 8, FIG. 9, and FIG. 10, detailed explanation thereof will be omitted.

FIG. 13 illustrates an example in which the virtual object 612 that is too small to be viewed is selected from the virtual objects 211 to 213, 411 to 413, 611 to 613 displayed in a list to heighten visibility of the selected virtual object 612.

In this case, the virtual object posture operation processing unit 154 executes an operation to enlarge a shape of the virtual object 612; moves and arranges the enlarged virtual object toward a predetermined position in front thereof; and displays it as a virtual object 1101. At that time, the list display of all the virtual objects 211 to 213, 411 to 413, and 611 to 613 is left in a background portion in the display screen.

Alternatively, the virtual object posture operation processing unit 154 may execute an enlargement operation after moving the virtual object 612 toward the front without leaving it. The predetermined position is set to a position where it is easy to visually recognize the virtual object 612 as an initial value. This initial value is stored in advance in the memory 124, for example.

Further, the initial value may be set by the control unit 125 writing setting information inputted by the user through the operational input interface 121 into the memory 124. For example, by setting a movable range portion of a hand in front of the body as the initial value that is the position defined in advance, it is easy to visually recognize the virtual object, and it is also easy to carry out the posture operation and the deformation operation.

The operation to move the virtual object toward the position defined in advance may be moved and arranged automatically by selecting an arbitrary virtual object using the operational input interface 121 by the user. Alternatively, it may be arranged mutually by a natural operation such as pulling the selected object. Further, when it is arranged, the user may carry out an operation to determine an enlargement ratio using the operational input interface 121 to change the enlargement ratio.

The above operation is that the control unit 125 controls the virtual object posture operation processing unit 154 and the like in accordance with a user operation inputted from the operational input interface 121. The virtual object posture operation processing unit 154 changes information on a shape and a display position of the selected object.

The display control unit 151 reads the information data 127 on the shape and the display position of the virtual object stored in the memory 124, and displays it on the display 122.

This makes it possible to visually recognize the virtual object that is too small to be viewed in the list display more clearly. The selected virtual object is returned to the original position before an arrangement operation of the background portion in the display screen by control of the control unit 125 after visually confirming. This operation is executed automatically after an operation to end visual confirmation.

Subsequently, in a case where an operation to select another virtual object to move and arrange it to the front, the previously selected virtual object returns to the original position thereof, and a list display image of the original virtual objects remains as a background. This makes it possible to easily carry out the arrangement operation and visual confirmation of a next virtual object.

It is possible to visually recognize existence of all the groups of virtual objects in the display in which the virtual objects are arranged in the entire celestial sphere image. However, it may be difficult to visually recognize the entire shape of the virtual objects.

Therefore, with respect to the virtual object arranged on the display screen of the display 122 and that it is difficult to visually recognize, posture of the virtual object is operated by the virtual object posture operation processing unit 154 so that it is easy to visually recognize the entire shape of the virtual object to display the virtual object.

For example, the virtual object 411 illustrated in FIG. 14 originally has a cubic shape, but becomes a display shape that cannot be visually recognized as a cube by a display shape of the entire celestial sphere image. The virtual object posture operation processing unit 154 first moves the virtual object 411 toward a display position in front of which it is easy to operate posture thereof while enlarging it.

Then, the virtual object posture operation processing unit 154 rotates the virtual object 411 after movement including a three-dimensional rotational operation, and executes a posture operation to a display shape by which it is easy to visually recognize the entire shape, thereby being converted into a display shape indicated by a virtual object 1201 and displayed.

The virtual object 1201 may be returned to the original position before the arrangement operation as the virtual object 411 after the virtual object 1201 is visually confirmed.

Thus, the virtual object posture operation processing unit 154 executes the posture operation for the virtual object whose entire shape is difficult to be recognized visually to convert it into a virtual object with a display shape by which the entire shape can be visually recognized, whereby it becomes possible to visually recognize and grasp the entire shape and the whole aspect of the virtual object accurately.

The operation to display the virtual object in the display shape by which it is easy to visually recognize the entire shape may be displayed by a display shape stored in advance in the memory 124 without carrying out the posture operation by the user, for example. For the display shape whose entire shape is easy to visually recognize, information on orientation, a size, and a color by which the object is visually recognized easily may be stored in advance in the shape data that become a model at the time of generating the virtual object in the memory 124 as posture information, and the posture information may be used by taking over it to the generated virtual object. Further, the user may specify the posture information for each virtual object, thereby storing the posture information in the memory 124, and using it at the time of display thereof.

<Deformation Operation of Virtual Object>

Moreover, the virtual object deformation operation processing unit 156 can execute the deformation operation for the virtual object. The virtual object deformation operation processing unit 156 reads the shape and the display position of the virtual object, which are stored in the memory 124; changes information on the shape and the display position of the selected virtual object; and writes the changed information into the memory 124. The shape of the virtual object contains orientation, a size, an angle, and the like.

The display control unit 151 reads information written into the memory 124, and displays the virtual object subjected to the deformation operation on the display 122 on the basis of the information.

A result of the deformation operation by the virtual object deformation operation processing unit 156 is also reflected to the display state of the original virtual object. In a case where the orientation of the virtual object is changed by the deformation operation, the orientation of the virtual object itself is changed. Therefore, the virtual object is displayed so as to overlap with the landscape of the real space. For example, even in normal display states illustrated in FIG. 2, FIG. 6, and FIG. 8, the virtual object is displayed in the orientation after the deformation operation.

At the time of the deformation operation, by displaying the shape of the original virtual object before the deformation, which contains orientation, a size, and the like, by semi-transparent or displaying it at a place in the visual field, which is not used in the deformation operation, a difference between the original virtual object before the deformation and the shape of the virtual object after the deformation, which contains orientation, a size, and the like, may be displayed in an easily understood manner.

Whether any of the posture operation and the deformation operation is to be carried out for the virtual object is specified before the operation by an operation mode switching button (not illustrated in the drawings) or the like provided in the head mounted information processing apparatus 100, for example.

By combining the posture operation and the deformation operation, the deformation operation may be carried out after the virtual object is enlarged and easily viewed by the posture operation. Further, an operation applied to the virtual object by the posture operation, such as rotation, enlargement, reduction, or the like may be applied to the deformation operation.

<Display Example of Group of Virtual Objects of Another Real Space>

Subsequently, an operation when all groups of virtual objects arranged so as to be associated with another real space from the present real space are displayed will be described with reference to FIG. 15 to FIG. 18.

Since the portions illustrated in FIG. 2, FIG. 3, FIG. 6, FIG. 7, FIG. 8, FIG. 9, and FIG. 10 to which the same reference numerals are respectively assigned in FIG. 15 to FIG. 18 have the similar operations as the operations that have already been described in FIG. 2, FIG. 3, FIG. 6, FIG. 7, FIG. 8, FIG. 9, and FIG. 10, detailed explanation thereof will be omitted.

Figure 15:
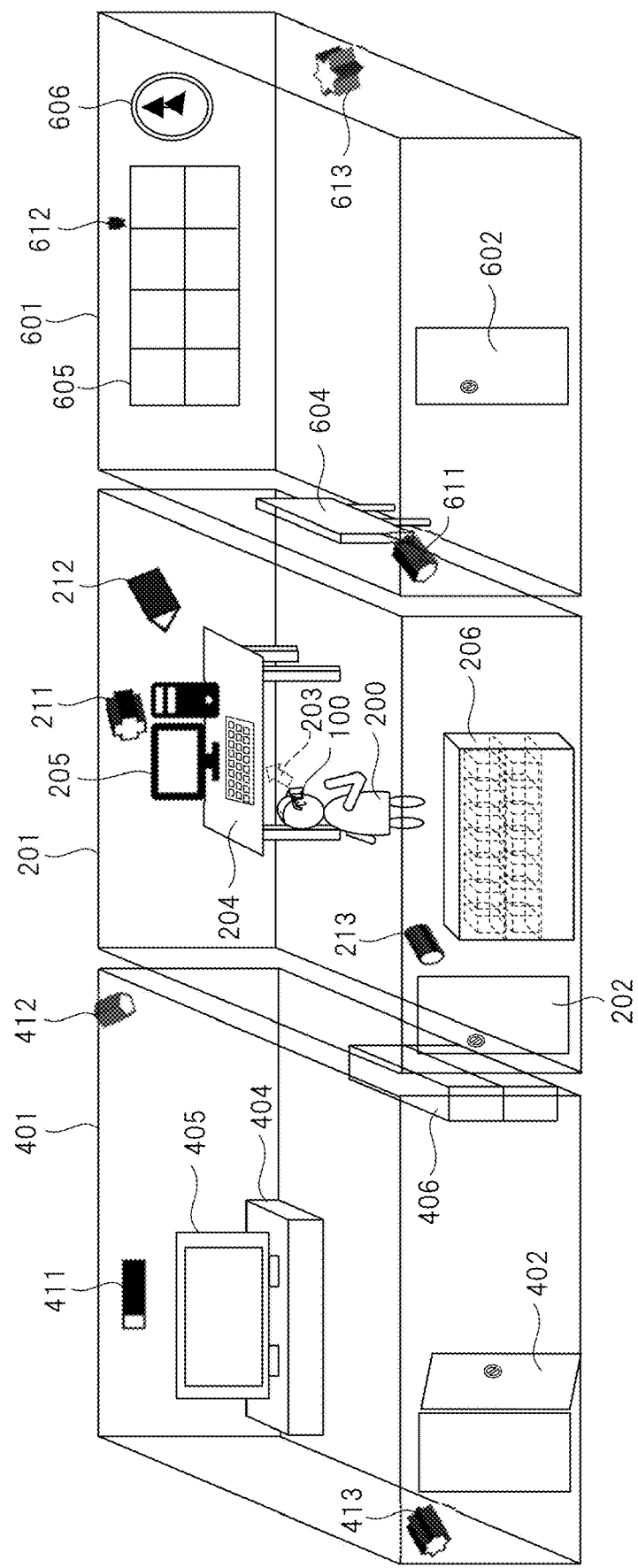
FIG. 15 is an explanatory drawing illustrating one example of a panoramic view of the surroundings in a case where all virtual objects in a plurality of real spaces are viewed.

FIG. 15 is an explanatory drawing illustrating one example of a panoramic view of the surroundings in a case where all virtual objects in a plurality of real spaces are viewed.

In FIG. 15, as well as the case illustrated in FIG. 2, a user 200 who wears a head mounted information processing apparatus 100 is positioned at the center of a first room 201, and is in a state where the user 200 views a direction 203 opposite to an entrance door 202.

Further, a desk 204, a personal computer 205, and a bookshelf 206 are placed in the first room 201. As well as FIG. 2, virtual objects 211, 212, and 213 are arranged in the first room 201 as a group of first virtual objects generated by a virtual object generation processing unit 155.

A second room 401 is arranged to the left of the first room 201, and a third room 601 is arranged to the right of the first room 201. A television stand 404, a television 405, and a shelf 406 are placed in the second room 401.

As well as FIG. 6, virtual objects 411, 412, and 413 are arranged in the second room 401 as a group of second virtual objects generated by the virtual object generation processing unit 155.

A board 604, a window 605, and a clock 606 are arranged in the third room 601. As well as FIG. 8, virtual objects 611, 612, and 613 are arranged in the third room 601 as a group of third virtual objects generated by the virtual object generation processing unit 155.

Figure 16:
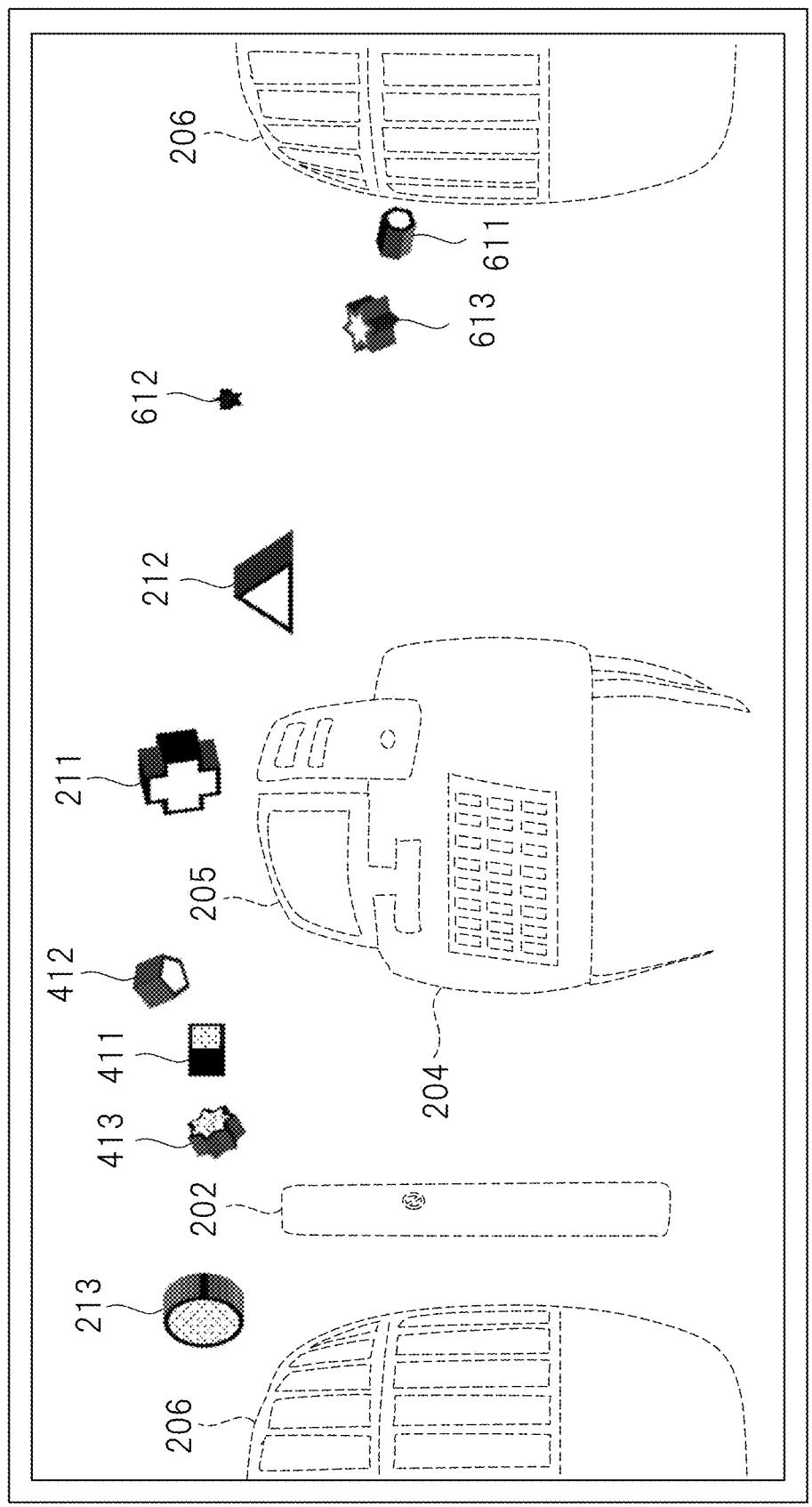
FIG. 16 is an explanatory drawing illustrating one example of display of the virtual objects in a state when viewed from a direction opposite to rear entrances illustrated in FIG. 15.

FIG. 16 is an explanatory drawing illustrating one example of display of the virtual objects in a state when viewed from a direction 203 opposite to the entrance door 202 at the rear of FIG. 15. As illustrated in FIG. 16, the virtual objects 411 to 413 and 611 to 613 arranged so as to be associated with another real space are displayed in a display screen by making objects that partition the real spaces, such as a room wall, transparent.

This makes it possible to visually recognize all the virtual objects 211 to 213, 411 to 413, and 611 to 613 easily regardless of the real spaces, and it is possible to improve usability when selecting a desired virtual object.

Each of the virtual objects is displayed so that the display position thereof allows the real space with which the corresponding virtual object is arranged so as to be associated to be recognized easily.

For example, in FIG. 16, the virtual objects 611 to 613 are positioned and displayed on the right side of the display screen. This makes it possible to easily recognize that the group of virtual objects is arranged so as to be associated with the third room 601 illustrated in FIG. 15.

Similarly, the virtual objects 411 to 413 are positioned and displayed on the left side of the display screen. This makes it possible to easily recognize that the group of virtual objects is arranged so as to be associated with the second room 401 illustrated in FIG. 15.

Figure 17:
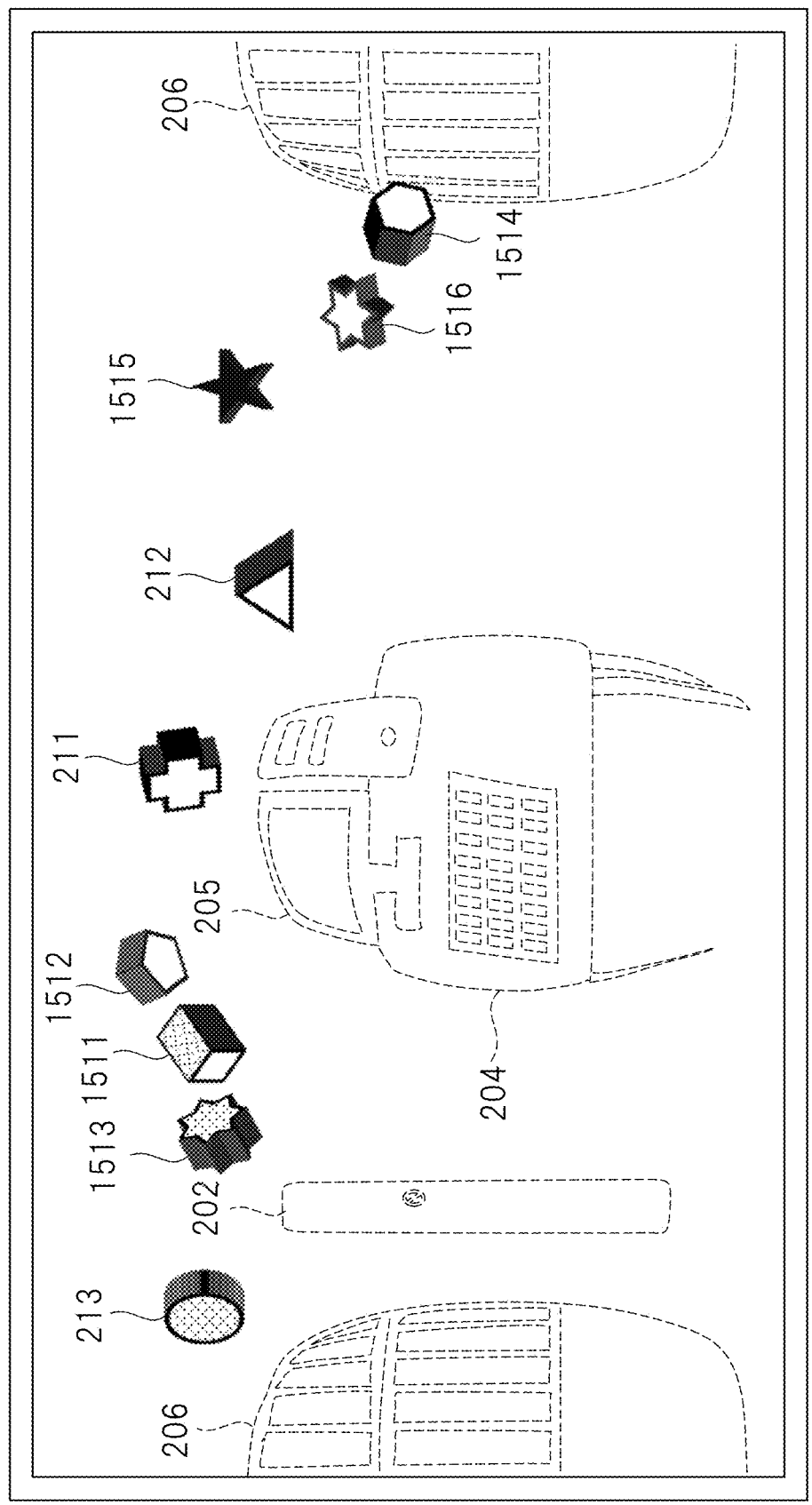
FIG. 17 is an explanatory drawing illustrating another example of the display of the virtual objects illustrated in FIG. 16.

FIG. 17 is an explanatory drawing illustrating another example of the display of the virtual objects illustrated in FIG. 16. Here, in the display example illustrated in FIG. 16, there is a fear that if another room, that is, another real space is far away, a group of virtual objects arranged so as to be associated with the real space is displayed so as to be small, whereby it is difficult for the user to visually recognize the group of virtual objects.

In such a case, the virtual objects 411 to 413 are enlarged and displayed as virtual objects 1514 to 1516. Similarly, the virtual objects 611 to 613 are enlarged and displayed as virtual objects 1511 to 1513.

The virtual object posture operation processing unit 154 executes an operation to enlarge a shape for each of the virtual objects 411 to 413, and 611 to 613 to generate the virtual objects 1511 to 1516 thus enlarged.

This makes it possible to visually recognize the virtual objects, which are too small to be viewed, more clearly. Note that at the time of the operation to enlarge the shape of the virtual object by the virtual object posture operation processing unit 154, the shape of the virtual object may be enlarged to a size that is easily handled and viewed.

Further, with respect to the virtual object 1511, the virtual object 411 illustrated in FIG. 16 is displayed in a display shape in which the entire shape thereof is visually recognized easily on the basis of the posture information described above and specified in advance. By specification of the user, a part of the virtual objects or all of the virtual objects may be displayed in the display shape in which the entire shape thereof is visually recognized easily.

As illustrated in FIG. 16, by making the room walls or the like that block another real space from the present real space transparent and displaying all the virtual objects, it is possible to easily identify the real space with which the selected virtual object is arranged so as to be associated.

Figure 18:
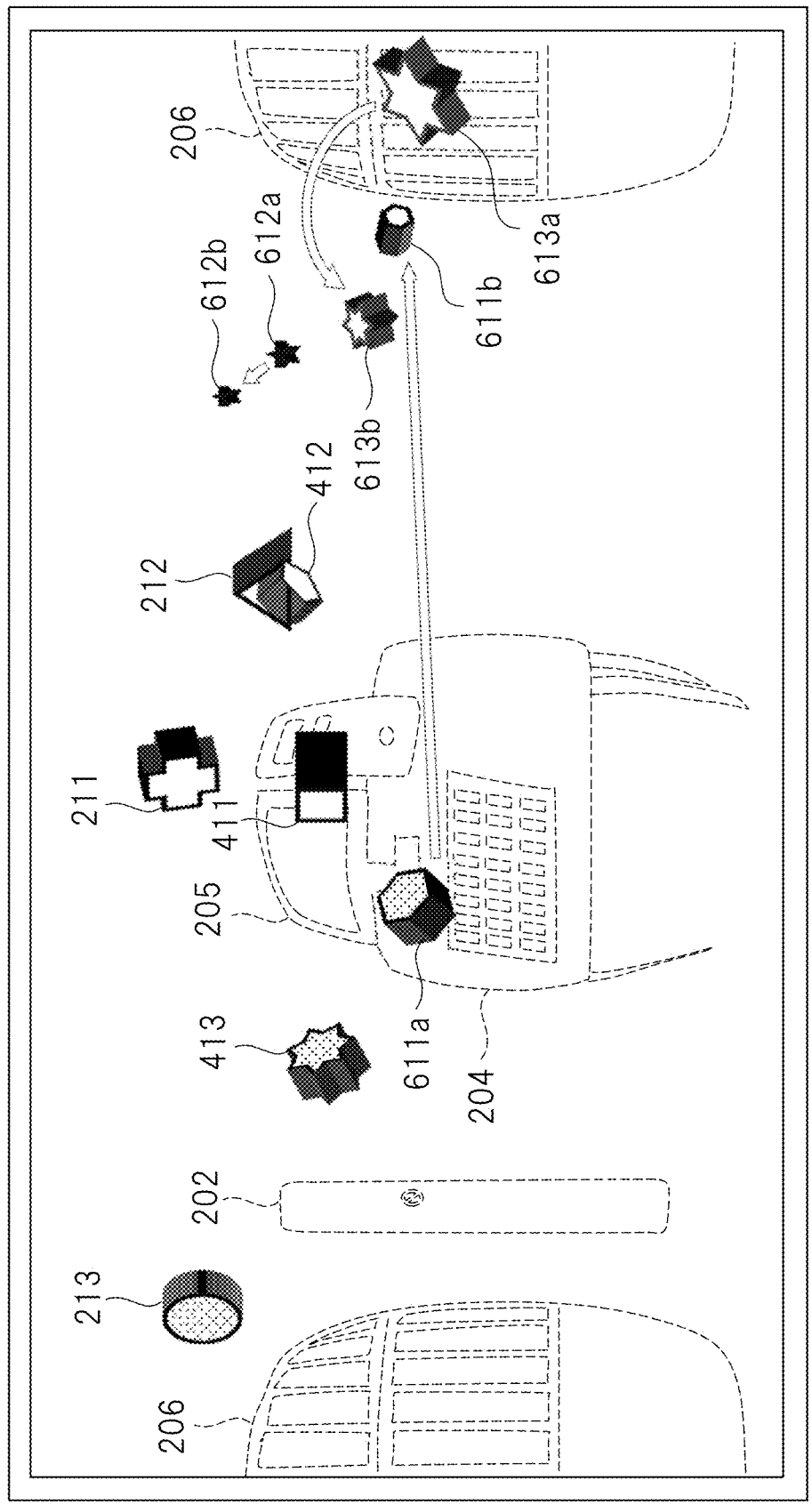
FIG. 18 is an explanatory drawing illustrating still another example of the display of the list of the group of virtual objects illustrated in FIG. 16.

FIG. 18 is an explanatory drawing illustrating still another example of the display of the list of the group of virtual objects illustrated in FIG. 16. FIG. 18 illustrates a display example when the display illustrated in FIG. 10 is shifted to the display illustrated in FIG. 16. Virtual objects 611*a*, 612*a*, and 613*a* correspond to the virtual objects illustrated in FIG. 10. Virtual objects 611*b*, 612*b*, and 613*b* are virtual objects when the display illustrated in FIG. 10 is shifted to the display illustrated in FIG. 16.

Namely, when the display illustrated in FIG. 10 is shifted to the display illustrated in FIG. 16, as illustrated in FIG. 18, the virtual objects 611*a*, 612*a*, and 613*a* move as the virtual objects 611*b*, 612*b*, and 613*b* so as to gather together to a right side portion of the display screen.

This makes it possible to easily recognize that these virtual objects 611*b*, 612*b*, and 613*b* are virtual objects arranged so as to be associated with the third real space of the third room 601, which is positioned on the right side of the screen of the first room 201.

At the time of this display shift, by slowly and gradually shifting the display at a speed where the user can follow the virtual objects with his or her eyes, it is possible for the user to visually recognize which real space the group of moving virtual objects is the virtual objects arranged so as to be associated with surely.

Although the example in which an arbitrary group of virtual objects is moved has been described in FIG. 18, all the virtual objects may be moved at the same time. Further, only selected one or a plurality of selected virtual objects may be moved and displayed, and the other virtual objects that are not selected may not be displayed.

Subsequently, a case where a group of virtual objects arranged so as to be associated with each real space is multi-displayed will be described.

Figure 19:
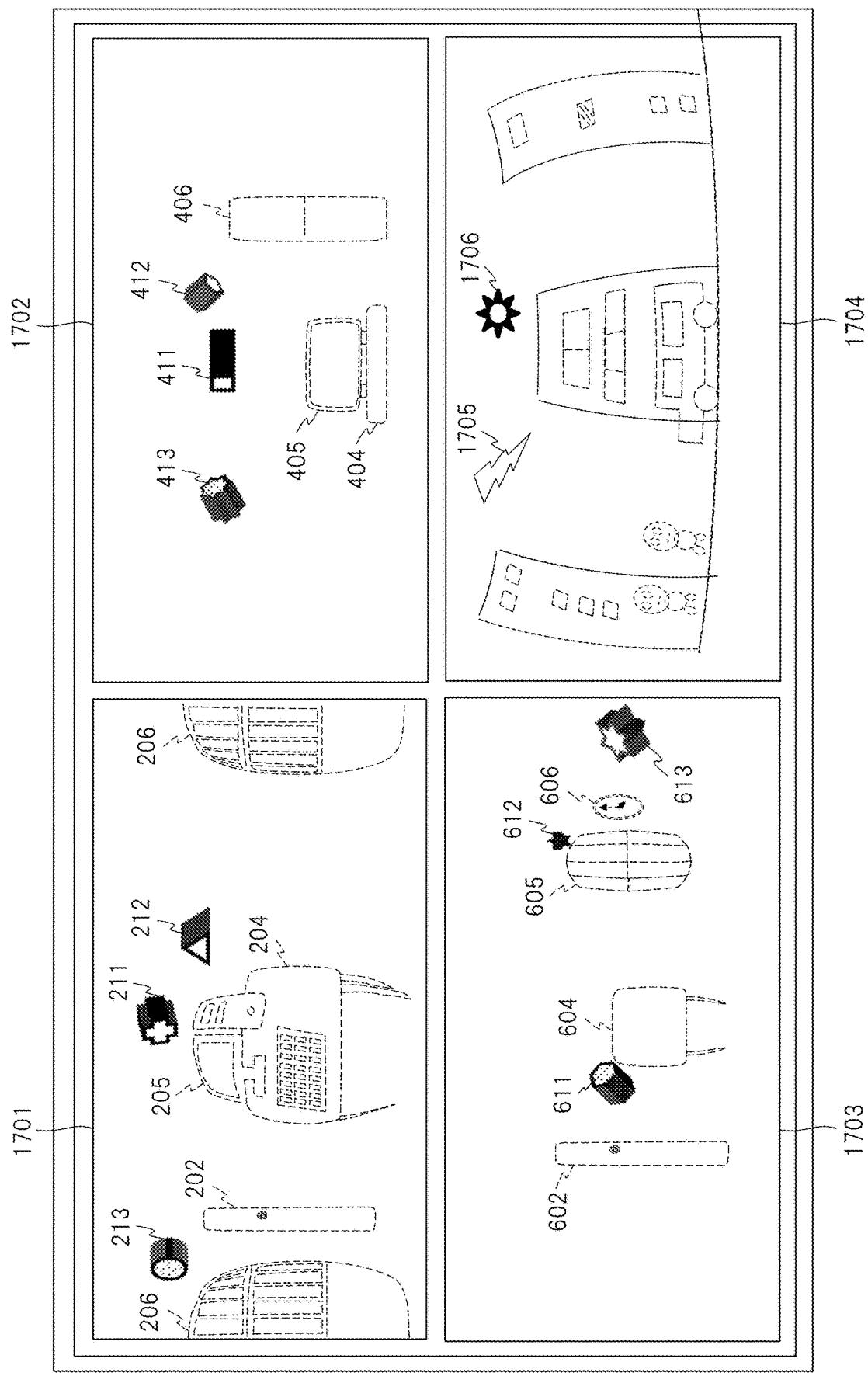
FIG. 19 is an explanatory drawing illustrating one example of a multi-display screen by the head mounted information processing apparatus illustrated in FIG. 1.

FIG. 19 is an explanatory drawing illustrating one example of a multi-display screen by the head mounted information processing apparatus illustrated in FIG. 1. FIG. 19 illustrates an example in which the display screens illustrated in FIG. 3, FIG. 7, and FIG. 9 are reduced and multi-displayed on the display screen of the display 122.

Since the portions illustrated in FIG. 2, FIG. 3, FIG. 6, FIG. 7, FIG. 8, FIG. 9, and FIG. 10 to which the same reference numerals are respectively assigned in FIG. 17 have the similar operations as the operations that have already been described in FIG. 2, FIG. 3, FIG. 6, FIG. 7, FIG. 8, FIG. 9, and FIG. 10, detailed explanation thereof will be omitted.

In FIG. 19, a display screen 1701, a display screen 1702, a display screen 1703, and a display screen 1704 are displayed on the display screen of the display 122 in order from the upper left.

The group of first virtual objects arranged so as to be associated with the first real space is displayed on the display screen 1701. The group of second virtual objects arranged so as to be associated with the second real space is displayed on the display screen 1702. The group of third virtual objects arranged so as to be associated with the third real space is displayed on the display screen 1703. The group of fourth virtual objects arranged so as to be associated with the fourth real space is displayed on the display screen 1704.

In the display screen 1704 on which the group of fourth virtual objects is displayed, virtual objects 1705 and 1706 are arranged so as to be associated with the fourth real space composed of a landscape including buildings, a vehicle, humans, and the like.

In a case where a desired virtual object is selected, the user searches the display screens 1701 to 1704 obtained by reducing the group of virtual objects arranged so as to be associated with each of the real spaces illustrated in FIG. 19 and multi-displaying them side by side. Then, the user changes the display screen on which the selected virtual object exists into a normal full display screen to become a state where the desired virtual object can be visually recognized easily.

This makes it possible to easily select the real space, in which the desired virtual object is arranged, from the multi-display screen on which the groups of virtual objects respectively arranged so as to be associated with the real spaces are displayed. Moreover, since only the group of virtual objects arranged so as to be associated with the selected virtual object is displayed, it becomes possible to visually recognize the desired virtual object in an easily visible state.

Note that FIG. 19 illustrates the 4-multi display in which the four display screens are displayed, but a multi-display method may have various variations such as 9-multi display or 16-multi display, for example.

Figure 20:
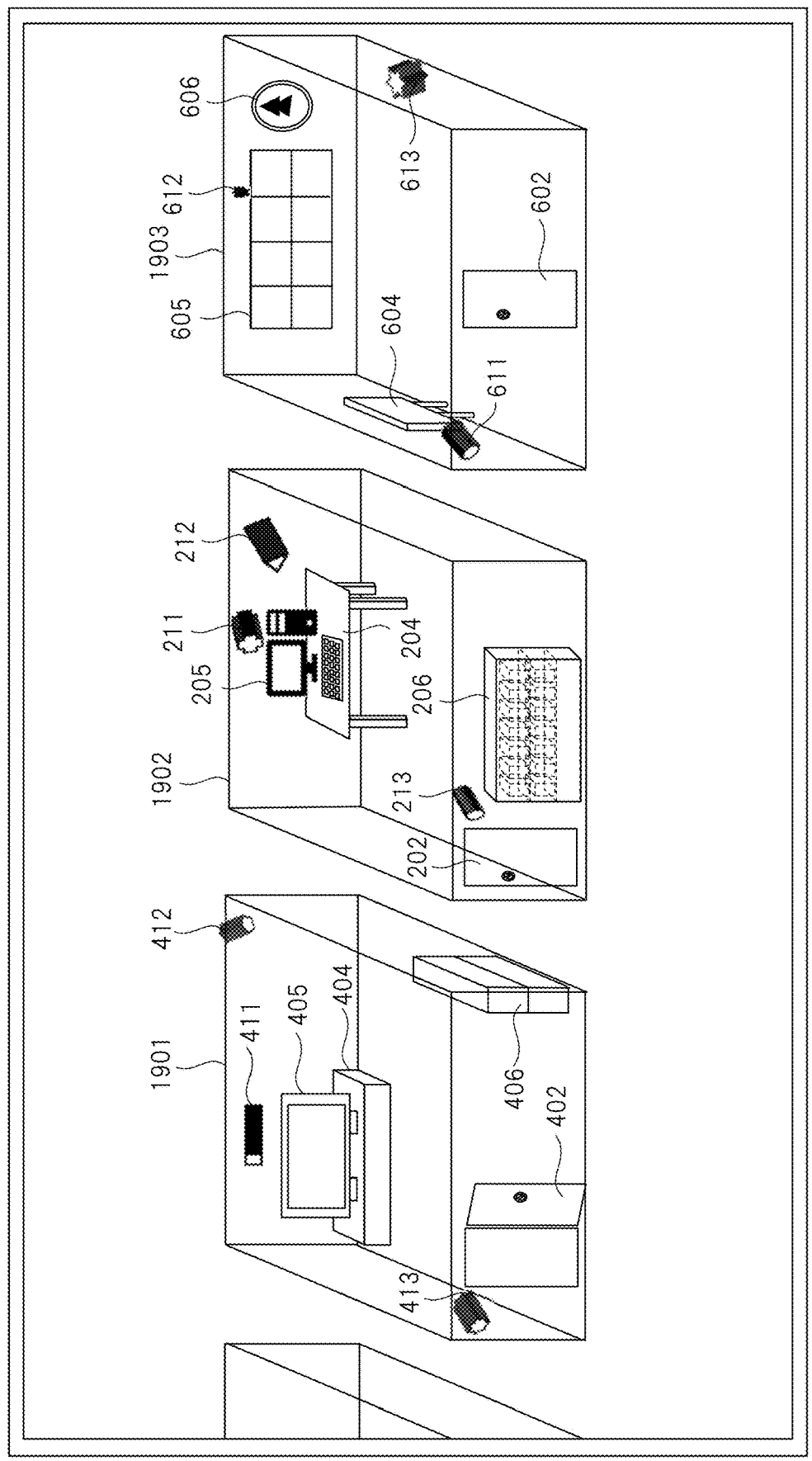
FIG. 20 is an explanatory drawing illustrating another display example of FIG. 19.

Further, as illustrated in FIG. 20, a plurality of spaces may be displayed side by side in a bird's eye view. In this case, the video processing unit 153 generates an image having a bird's eye view, and the display control unit 151 displays the image generated by the video processing unit 153 on the display 122. This makes it easier to image the space, and it is possible to facilitate selection of the space in which the desired virtual object is included.

When a bird's-eye video of the space is generated, by displaying an avatar of the user himself or herself at a position where the user is currently present in the video, it is possible to easily grasp the space where the user himself or herself exists.

Further, in a case where any other user exists in the plurality of displayed spaces, coordinate information on the space where the other user exists may be obtained by wireless communication or the like, and the other user may be displayed at the corresponding coordinate position on the bird's-eye space.

Similarly, existence of the user himself or herself or the other user may be displayed on the image of the multi-display by an avatar or a mark. This makes it possible to easily grasp a positional relationship between the spaces and each user.

The position of the user himself or herself on the space can be specified by using various kinds of sensor information, for example, a distance to the wall obtained by the depth sensor, an image photographed by the camera unit 111, and the like. An image of the avatar to be displayed is stored in advance in the memory 124 as the information data 127. Then, the video processing unit 153 synthesizes video of the space using the information data 127 stored in the memory 124.

The coordinate information of the other user is obtained from various kinds of sensors or a camera of an information terminal worn by the user, and is transmitted from a communication interface included in the information terminal. The head mounted information processing apparatus 100 directly receives the coordinate information through a communication interface 1804. Alternatively, the head mounted information processing apparatus 100 may receive the coordinate information via a server (not illustrated in the drawings).

The state where the virtual objects are arranged in the real space where the user exists has been described as the examples with reference to FIG. 2 to FIG. 19. However, the similar operations can be made even in a case where the space itself handled by the user is a virtual space and virtual objects are arranged in the virtual space, such as VR.

Further, the virtual object can be used as a reminder. The virtual object generation processing unit 155 can generate virtual objects in a space other than the space where the user currently exists.

By using this function, the virtual object can be used as the reminder. For example, the virtual object generation processing unit 155 generates a virtual object of umbrella and arranges it at an entrance while the user is staying in a living room, thereby becoming a reminder to remember the umbrella when the user goes out.

Note that information indicating the request instruction by the user through the operational input interface 121, the operation by the head mounted information processing apparatus 100, and a display operation may be displayed on the display 122.

Alternatively, the information described above may be notified to the user by being vocalized to the user by voice from the headphone 120, generating vibration by the vibration generating unit 117 that is in close contact with the user, or generating stimulus by the stimulus generating unit 146.

As a result, it is possible to cause the user to notify and recognize an operating state of the head mounted information processing apparatus 100 surely.

Further, the input operations for the operation executed by the head mounted information processing apparatus 100 and the operation of the display may be taken not only from the input operation by the operational input interface 121, but also from an input operation based on a motion obtained by detecting the motion of the hand of the user by the camera unit 111 or the like, for example.

As described above, the virtual objects can easily be browsed and operated even though the virtual objects exist in another real space.

Second Embodiment

<Configuration Example of Head Mounted Display System>

Figure 21:
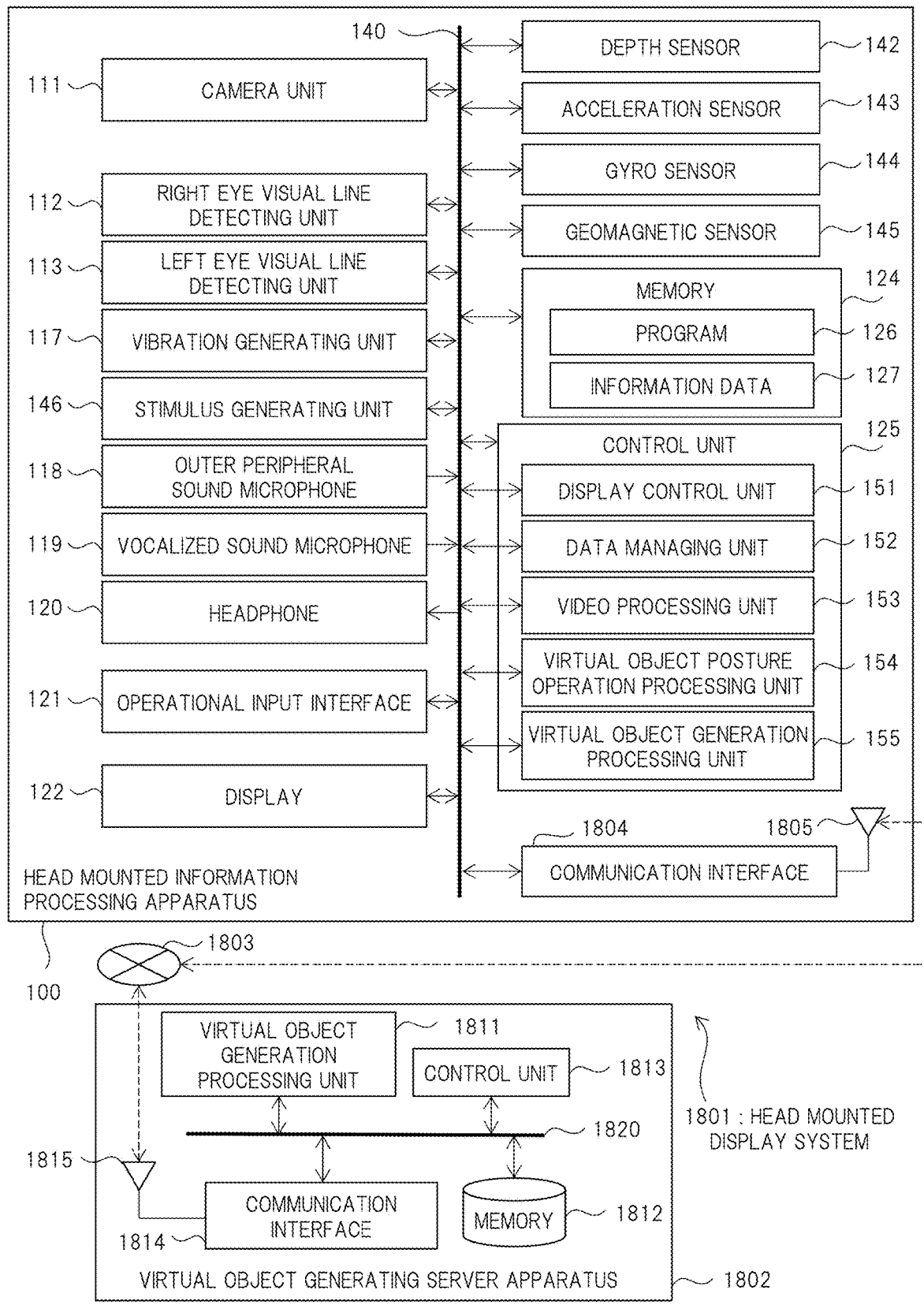
FIG. 21 is a block diagram illustrating one example of a configuration of a head mounted display system according to a second embodiment.

FIG. 21 is a block diagram illustrating one example of a configuration of a head mounted display system 1801 according to a second embodiment.

As illustrated in FIG. 21, the head mounted display system 1801 includes a head mounted information processing apparatus 100 and a virtual object generating server apparatus 1802. Each of the head mounted information processing apparatus 100 and the virtual object generating server apparatus 1802 is connected to a network 1803.

The head mounted information processing apparatus 100 illustrated in FIG. 21 is newly provided with a communication interface 1804 and a transmission/reception antenna 1805 in addition to the configuration of the respective functional blocks to which the same reference numerals illustrated in FIG. 1 are assigned. On the other hand, the head mounted information processing apparatus 100 illustrated in FIG. 21 is not provided with a virtual object generation processing unit 155.

The virtual object generating server apparatus 1802 includes a virtual object generation processing unit 1811, a memory 1812, a control unit 1813, a communication interface 1814, a transmission/reception antenna 1815, and the like. The respective functional blocks in the virtual object generating server apparatus 1802 are connected to each other via a bus 1820. Note that in FIG. 21, the same reference numerals are respectively assigned to the same processing units as the first embodiment illustrated in FIG. 1, and explanation thereof will be omitted.

In the head mounted display system 1801, the virtual object generation processing unit 1811 included in the virtual object generating server apparatus 1802 is configured to generate virtual objects.

The virtual objects generated by the virtual object generation processing unit 1811 are stored in the memory 1812. The communication interface 1814 is configured to transmit the virtual objects stored in the memory 1812 to the head mounted information processing apparatus 100 via the network 1803 that is a communication network from the transmission/reception antenna 1815. The head mounted information processing apparatus 100 receives the virtual objects transmitted via the network 1803.

Further, in FIG. 21, a process of displaying the virtual objects by the head mounted information processing apparatus 100 itself is similar to that in the first embodiment. However, the second embodiment is different from the first embodiment in that the virtual object generating server apparatus 1802 that is an apparatus other than the head mounted information processing apparatus 100 generates virtual objects.

In the virtual object generating server apparatus 1802, the memory 1812 is a nonvolatile semiconductor memory such as a flash memory in the similar manner to the memory 124 of the head mounted information processing apparatus 100.

Various kinds of programs and the generated virtual objects to be used by the control unit 1813 of the virtual object generating server apparatus 1802 are stored in the memory 1812. The communication interface 1814 is a communication interface that communicates with the head mounted information processing apparatus 100 via the network 1803, and is configured to transmit and receive information to and from the head mounted information processing apparatus 100.

The control unit 1813 is composed of a CPU or the like, for example. The control unit 1813 is configured to execute an OS or programs such as an application for controlling an operation, which are memorized and stored in the memory 1812, thereby controlling each of the functional blocks, and controlling the whole virtual object generating server apparatus 1802.

The control unit 1813 is configured to control generation of the virtual object by the virtual object generation processing unit 1811, storage of the generated virtual objects in the memory 1812, and the like. Further, the control unit 1813 controls the communication interface 1814 to transmit the generated virtual objects to the head mounted information processing apparatus 100 in accordance with a request to transmit and output the virtual objects from the head mounted information processing apparatus 100.

This makes it possible to generate the virtual objects not by the head mounted information processing apparatus 100, but by the virtual object generating server apparatus 1802 separated from the head mounted information processing apparatus 100.

As a result, it is possible to increase a scale of the amount of virtual object information that can be handled. It becomes possible to generate virtual objects respectively required by a plurality of head mounted information processing apparatuses 100 at a plurality of places at the same time and distribute them thereto.

As described above, it is possible to easily visually recognize and operate the virtual objects arranged in separate real spaces by the plurality of head mounted information processing apparatuses 100 at the same time.

As described above, the invention made by inventors of the present application has been described specifically on the basis of the embodiments. However, the present invention is not limited to the embodiments described above, and it goes without saying that the present invention may be modified into various forms without departing from the substance thereof.

Note that the present invention is not limited to the embodiments described above, and various modifications are contained. For example, the embodiments described above have been explained in detail for explaining the present invention clearly. The present invention is not necessarily limited to one that includes all configurations that have been explained.

Further, a part of the configuration of one embodiment can be replaced by a configuration of the other embodiment. Further, a configuration of the other embodiment can be added to a configuration of one embodiment. Further, a part of the configuration of each of the embodiments can be added to the other configuration, deleted, or replaced thereby.

Further, a part or all of the respective configuration described above, the functions, processing units, and processing functions may be realized by hardware that is designed by an integrated circuit, for example. Further, the respective configuration described above and the functions may be realized by software so that a processor interprets programs realizing the respective functions and execute the interpreted programs. Information on programs, tables, and files, which realize the respective functions, can be placed in a recording device such as a memory, a hard disk, or an SSD (Solid State Drive), or a recording medium such as an IC card, an SD card, or a DVD.

Further, control lines and information lines are illustrated so long as they are thought to be necessary for explanation. All of the control lines and the information line are not necessarily illustrated on a product. In fact, it may be considered that almost all of the components are connected to each other.

REFERENCE SIGNS LIST

100 head mounted information processing apparatus
111 camera unit
112 right eye visual line detecting unit
113 left eye visual line detecting unit
117 vibration generating unit
118 outer peripheral sound microphone
119 vocalized sound microphone
120 headphone
121 operational input interface
122 display
124 memory
125 control unit
140 bus
142 depth sensor
143 acceleration sensor
144 gyro sensor
145 geomagnetic sensor
146 stimulus generating unit
151 display control unit
152 data managing unit
153 video processing unit
154 virtual object posture operation processing unit
155 virtual object generation processing unit
156 virtual object deformation operation processing unit
1801 head mounted display system
1802 virtual object generating server apparatus
1803 network
1804 communication interface
1805 transmission/reception antenna
1811 virtual object generation processing unit
1812 memory
1813 control unit
1814 communication interface
1815 transmission/reception antenna

The invention claimed is:

1. A head mounted information processing apparatus comprising:
   an operational input interface through which information is inputted;
   a camera unit configured to photograph a real space;
   a display unit configured to display a photographic image photographed by the camera unit; and
   a control unit configured to control the display unit,
   wherein the control unit includes a virtual object generation processing unit configured to generate a virtual object to be displayed by the display unit,
   wherein the virtual object generation processing unit is configured to generate a first virtual object and a second virtual object, the first virtual object being arranged so as to be associated with a first real space in which a user exists, the second virtual object being arranged so as to be associated with a second real space different from the first real space,
   wherein the control unit is configured to cause the display unit to display the first virtual object and the second virtual object so as to overlap with each other,
   wherein the control unit is configured to cause the display unit to display the second virtual object at a coordinate of a same position as that in a case where the second virtual is displayed in the second real space,
   wherein the control unit is configured to cause the display unit to display the first virtual object and the second virtual object so as to be shifted in a case where the first virtual object and the second virtual object are to be displayed so as to overlap with each other, and
   wherein the control unit is configured to generate a display mark and virtual lines and cause the display unit to display the first virtual object and the second virtual object together with the display mark and the virtual lines, the display mark indicating a display position where the first virtual object and the second virtual object overlap with each other, the virtual lines respectively connecting the display mark to the first virtual object and the second virtual object.

2. A head mounted information processing apparatus comprising:
   an operational input interface through which information is inputted;
   a camera unit configured to photograph a real space;
   a display unit configured to display a photographic image photographed by the camera unit; and
   a control unit configured to control the display unit,
   wherein the control unit includes a virtual object generation processing unit configured to generate a virtual object to be displayed by the display unit,
   wherein the virtual object generation processing unit is configured to generate a first virtual object and a second virtual object, the first virtual object being arranged so as to be associated with a first real space in which a user exists, the second virtual object being arranged so as to be associated with a second real space different from the first real space,
   wherein the control unit is configured to cause the display unit to display the first virtual object and the second virtual object so as to overlap with each other, and
   wherein the control unit is configured to switch between the first virtual object and the second virtual object every fixed time, and cause the display unit to display the switched one.

* * * * *